United States Patent
Anguchamy et al.

(10) Patent No.: US 9,139,441 B2
(45) Date of Patent: Sep. 22, 2015

(54) POROUS SILICON BASED ANODE MATERIAL FORMED USING METAL REDUCTION

(75) Inventors: Yogesh Kumar Anguchamy, Newark, CA (US); Charan Masarapu, Fremont, CA (US); Haixia Deng, Fremont, CA (US); Yongbong Han, San Francisco, CA (US); Subramanian Venkatachalam, Pleasanton, CA (US); Sujeet Kumar, Newark, CA (US); Herman A. Lopez, Sunnyvale, CA (US)

(73) Assignee: Envia Systems, Inc., Newark, CA (US)

( * ) Notice: Subject to any disclaimer, the term of this patent is extended or adjusted under 35 U.S.C. 154(b) by 496 days.

(21) Appl. No.: 13/354,096

(22) Filed: Jan. 19, 2012

(65) Prior Publication Data

US 2013/0189575 A1    Jul. 25, 2013

(51) Int. Cl.
*H01M 4/525* (2010.01)
*C01B 33/023* (2006.01)
(Continued)

(52) U.S. Cl.
CPC ............ *C01B 33/023* (2013.01); *H01M 4/134* (2013.01); *H01M 4/366* (2013.01); *H01M 4/386* (2013.01); *B82Y 30/00* (2013.01); *H01M 4/362* (2013.01);
(Continued)

(58) Field of Classification Search
CPC ... H01M 4/134; H01M 4/625; H01M 10/052; H01M 4/386; H01M 4/9083; Y02E 60/12
USPC ................ 429/211, 217, 223, 218.1
See application file for complete search history.

(56) References Cited

U.S. PATENT DOCUMENTS

| 4,086,404 A | 4/1978 | Vissers et al. |
| 4,945,014 A | 7/1990 | Miyabayashi et al. |

(Continued)

FOREIGN PATENT DOCUMENTS

| EP | 2079120 A2 | 7/2009 |
| EP | 2141759 A1 | 1/2010 |

(Continued)

OTHER PUBLICATIONS

Chan et al., "High-performance lithium battery anodes using silicon nanowires," Nature Nanotechnology 3: 31-35 (Jan. 2008).
(Continued)

*Primary Examiner* — Cynthia H Kelly
*Assistant Examiner* — Monique Wills
(74) *Attorney, Agent, or Firm* — Dardi & Herbert, PLLC; Peter S. Dardi

(57) ABSTRACT

A porous silicon based material comprising porous crystalline elemental silicon formed by reducing silicon dioxide with a reducing metal in a heating process followed by acid etching is used to construct negative electrode used in lithium ion batteries. Gradual temperature heating ramp(s) with optional temperature steps can be used to perform the heating process. The porous silicon formed has a high surface area from about 10 m²/g to about 200 m²/g and is substantially free of carbon. The negative electrode formed can have a discharge specific capacity of at least 1800 mAh/g at rate of C/3 discharged from 1.5V to 0.005V against lithium with in some embodiments loading levels ranging from about 1.4 mg/cm² to about 3.5 mg/cm². In some embodiments, the porous silicon can be coated with a carbon coating or blended with carbon nanofibers or other conductive carbon material.

18 Claims, 10 Drawing Sheets

(51) Int. Cl.
  *H01M 4/134* (2010.01)
  *H01M 4/38* (2006.01)
  *B82Y 30/00* (2011.01)
  *H01M 4/36* (2006.01)
  *H01M 4/505* (2010.01)
  *H01M 4/62* (2006.01)
  *H01M 10/052* (2010.01)
  *H01M 4/02* (2006.01)
  *H01M 10/42* (2006.01)

(52) U.S. Cl.
  CPC ............. *H01M 4/505* (2013.01); *H01M 4/525* (2013.01); *H01M 4/622* (2013.01); *H01M 4/625* (2013.01); *H01M 10/052* (2013.01); *H01M 2004/021* (2013.01); *H01M 2010/4292* (2013.01); *Y02E 60/122* (2013.01); *Y02T 10/7011* (2013.01)

(56) References Cited

U.S. PATENT DOCUMENTS

| | | |
|---|---|---|
| 5,147,739 A | 9/1992 | Beard |
| 5,162,176 A | 11/1992 | Herr et al. |
| 5,395,711 A | 3/1995 | Tahara et al. |
| 5,436,093 A | 7/1995 | Huang et al. |
| 5,443,601 A | 8/1995 | Doeff et al. |
| 5,541,022 A | 7/1996 | Mizumoto et al. |
| 5,595,837 A | 1/1997 | Olsen et al. |
| 5,721,067 A | 2/1998 | Jacobs et al. |
| 5,743,921 A | 4/1998 | Nazri et al. |
| 5,753,388 A | 5/1998 | Koksbang et al. |
| 5,792,577 A | 8/1998 | Ejiri et al. |
| 5,948,569 A | 9/1999 | Moses et al. |
| 6,025,093 A | 2/2000 | Herr |
| 6,083,644 A | 7/2000 | Watanabe et al. |
| 6,235,427 B1 | 5/2001 | Idota et al. |
| 6,251,822 B1 | 6/2001 | Peng et al. |
| 6,335,115 B1 | 1/2002 | Meissner |
| 6,528,208 B1 | 3/2003 | Thackeray et al. |
| 6,645,671 B2 | 11/2003 | Tsutsumi et al. |
| 6,680,143 B2 | 1/2004 | Thackeray et al. |
| 6,699,336 B2 | 3/2004 | Turner et al. |
| 6,706,447 B2 | 3/2004 | Gao et al. |
| 6,737,191 B2 | 5/2004 | Gan et al. |
| 6,884,546 B1 | 4/2005 | Fujita et al. |
| 6,899,970 B1 | 5/2005 | Rogers et al. |
| 6,979,513 B2 | 12/2005 | Kelley et al. |
| 7,037,581 B2 | 5/2006 | Aramata et al. |
| 7,195,842 B1 | 3/2007 | Fujimoto et al. |
| 7,235,330 B1 | 6/2007 | Fujimoto et al. |
| 7,252,907 B2 | 8/2007 | Takeuchi et al. |
| 7,276,314 B2 | 10/2007 | Gao et al. |
| 7,297,446 B2 | 11/2007 | Fukui et al. |
| 7,432,015 B2 | 10/2008 | Jeong et al. |
| 7,452,632 B2 | 11/2008 | Lee et al. |
| 7,514,369 B2 | 4/2009 | Li et al. |
| 7,517,614 B2 | 4/2009 | Jeong et al. |
| 7,563,541 B2 | 7/2009 | Howard et al. |
| 7,582,387 B2 | 9/2009 | Howard et al. |
| 7,588,623 B2 | 9/2009 | Dover et al. |
| 7,615,314 B2 | 11/2009 | Kawakami et al. |
| 7,658,863 B2 | 2/2010 | Aramata et al. |
| 7,754,389 B2 | 7/2010 | Yamaguchi et al. |
| 7,776,473 B2 | 8/2010 | Aramata et al. |
| 7,790,316 B2 | 9/2010 | Aramata et al. |
| 7,816,031 B2 | 10/2010 | Cui et al. |
| 7,851,085 B2 | 12/2010 | Obrovac et al. |
| 7,871,727 B2 | 1/2011 | Obrovac et al. |
| 2001/0031396 A1 | 10/2001 | Tsutsumi et al. |
| 2003/0135989 A1 | 7/2003 | Huggins et al. |
| 2003/0157407 A1 | 8/2003 | Kosuzu et al. |
| 2004/0023117 A1 | 2/2004 | Imachi et al. |
| 2004/0033419 A1 | 2/2004 | Funabiki |
| 2004/0146734 A1 | 7/2004 | Miller et al. |
| 2004/0191630 A1 | 9/2004 | Kawamura et al. |
| 2004/0214085 A1 | 10/2004 | Sheem et al. |
| 2004/0241548 A1 | 12/2004 | Nakamoto et al. |
| 2005/0026040 A1 | 2/2005 | Thackeray et al. |
| 2005/0031942 A1 | 2/2005 | Hennige et al. |
| 2005/0130043 A1 | 6/2005 | Gao et al. |
| 2005/0175901 A1 | 8/2005 | Kawakami et al. |
| 2005/0214644 A1 | 9/2005 | Aramata et al. |
| 2005/0233213 A1 | 10/2005 | Lee et al. |
| 2006/0040182 A1 | 2/2006 | Kawakami et al. |
| 2006/0051677 A1 | 3/2006 | Matsushima et al. |
| 2006/0078797 A1 | 4/2006 | Munshi |
| 2007/0048612 A1 | 3/2007 | Nakajima et al. |
| 2007/0099436 A1 | 5/2007 | Kogetsu et al. |
| 2007/0207381 A1 | 9/2007 | Ohtsuka et al. |
| 2008/0113269 A1 | 5/2008 | Yamamoto et al. |
| 2008/0131772 A1 | 6/2008 | Jambunathan et al. |
| 2008/0193831 A1 | 8/2008 | Mah et al. |
| 2008/0213671 A1 | 9/2008 | Kogetsu et al. |
| 2008/0226988 A1 | 9/2008 | Minami et al. |
| 2009/0023065 A1 | 1/2009 | Hwang et al. |
| 2009/0029256 A1 | 1/2009 | Mah et al. |
| 2009/0053608 A1 | 2/2009 | Choi et al. |
| 2009/0092899 A1 | 4/2009 | Treger |
| 2009/0117466 A1 | 5/2009 | Zhamu et al. |
| 2009/0130562 A1 | 5/2009 | Mao et al. |
| 2009/0169994 A1 | 7/2009 | Mah et al. |
| 2009/0186267 A1 | 7/2009 | Tiegs |
| 2009/0214952 A1 | 8/2009 | Wakita et al. |
| 2009/0239151 A1 | 9/2009 | Nakanishi et al. |
| 2009/0263707 A1 | 10/2009 | Buckley et al. |
| 2009/0305131 A1 | 12/2009 | Kumar et al. |
| 2009/0317721 A1 | 12/2009 | Shirane et al. |
| 2009/0325061 A1 | 12/2009 | Lim |
| 2010/0009261 A1 | 1/2010 | Watanabe |
| 2010/0047671 A1 | 2/2010 | Chiang et al. |
| 2010/0086853 A1 | 4/2010 | Venkatachalam et al. |
| 2010/0086854 A1 | 4/2010 | Kumar et al. |
| 2010/0119939 A1 | 5/2010 | Misumi et al. |
| 2010/0119942 A1 | 5/2010 | Kumar |
| 2010/0120179 A1 | 5/2010 | Zhamu et al. |
| 2010/0151332 A1 | 6/2010 | Lopez et al. |
| 2010/0159366 A1 | 6/2010 | Shao-Horn et al. |
| 2010/0173198 A1 | 7/2010 | Zhamu et al. |
| 2010/0178566 A1 | 7/2010 | Kogetsu et al. |
| 2010/0243951 A1 | 9/2010 | Watanabe et al. |
| 2010/0288970 A1 | 11/2010 | Watanabe et al. |
| 2010/0330430 A1 | 12/2010 | Chung et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0085960 A1 | 4/2011 | Mukasyan et al. |
| 2011/0111294 A1* | 5/2011 | Lopez et al. .................. 429/217 |
| 2011/0111298 A1 | 5/2011 | Lopez et al. |
| 2011/0111304 A1 | 5/2011 | Cui et al. |
| 2011/0136019 A1 | 6/2011 | Amiruddin et al. |
| 2011/0244331 A1 | 10/2011 | Karthikeyan et al. |
| 2012/0028105 A1 | 2/2012 | Kumar et al. |
| 2012/0045670 A1 | 2/2012 | Stefan et al. |
| 2012/0056590 A1 | 3/2012 | Amiruddin et al. |
| 2012/0070725 A1 | 3/2012 | Venkatachalam et al. |
| 2012/0070741 A1* | 3/2012 | Liu et al. ....................... 429/219 |
| 2012/0105007 A1 | 5/2012 | Amiruddin et al. |
| 2012/0107680 A1 | 5/2012 | Amiruddin et al. |
| 2012/0121982 A1 | 5/2012 | Harimoto et al. |
| 2012/0295155 A1 | 11/2012 | Deng et al. |
| 2013/0078508 A1* | 3/2013 | Tolbert et al. ................. 429/188 |

FOREIGN PATENT DOCUMENTS

| | | |
|---|---|---|
| JP | 2009252705 A | 10/2009 |
| KR | 10-0493960 B1 | 6/2005 |
| WO | 2004/025757 A2 | 3/2004 |
| WO | 2005/011030 A1 | 2/2005 |
| WO | 2005/031898 A1 | 4/2005 |
| WO | 2005/065082 A2 | 7/2005 |
| WO | 2005/076389 A2 | 8/2005 |

(56) References Cited

FOREIGN PATENT DOCUMENTS

| WO | 2006/109930 A1 | 10/2006 |
|---|---|---|
| WO | 2011/053736 | 5/2011 |
| WO | 2011156419 A2 | 12/2011 |

OTHER PUBLICATIONS

Chen et al., "Electrochemical Insertion/extraction of Lithium in Multiwall Carbon Nanotube/Sb and SnSb0.5 Nanocomposites," published by the Massachusetts Institute of Technology, division of Molecular Engineering of Biological and Chemical Systems (Dec. 2003).

Chiang et al., "High Capacity, Temperature-Stable Lithium Aluminum Manganese Oxide Cathodes for Rechargeable Batteries," Electrochemical and Solid State Letters 2(3): 107-110 (1999).

Ito et al., Cyclic deterioration and its improvement for Li-rich layered cathode material Li [Ni0.17Li02Co0.07Mn0.56]O2, Journal of Power Sources 195: 567-573 (2010).

Ito et al., "A new approach to improve the high-voltage cyclic performance of Li-rich layered cathode material by electrochemical pre-treatment," Journal of Power Sources 183: 344-346 (2008).

Kang et al., "Enhancing the rate capability of high capacity xLi2MnO3 • (1-x)LiMO2 (M=Mn, Ni, Co) electrodes by Li—Ni—PO4 treatment," Electrochemistry Communications 11: 748-751 (2009).

Kang et al., "Layered Li(Li0.2Ni0.15+0.5zCo0.10Mn0.55-0.5z)O2-zFz cathode materials for Li-ion secondary batteries," Journal of Power Sources 146: 654-657 (2005).

Kim et al., "Synthesis of spherical Li[Ni(1/3-z)Co(1/3-z)Mn(1/3-z)Mgz]O2 as positive electrode material for lithium ion battery," Electrochimica Acta 51: 2447-2453 (2006).

Kim et al., "Improvement of High-Voltage Cycling Behavior of Surface Modified Li[Ni1/3Co1/3Mn1/3]O2 Cathodes by Fluorine Substitution for Li-Ion Batteries," Journal of the Electrochemical Society 152(9): A1707-A1713 (2005).

Lee et al., "High capacity Li[Li0.2Ni0.2Mn0.6]O2 cathode materials via a carbonate co-precipitation method," Journal of Power Sources 162: 1346-1350 (2006).

Liu et al., "Improvement of cycling stability of Si anode by mechanochemical reduction and carbon coatings," Journal of Power Sources 189: 480-484 (2009).

Liu et al., "Electrical transport in doped multiwalled carbon nanotubes," Physical Review B. vol. 63, 161404(R), pp. 1-4 (2001).

Schoenenberger et al., "Multiwall carbon nanotubes," http://physicsworld.com/cws/article/print/606 (printed Oct. 7, 2009).

Shi et al., "Nano-SnSb alloy deposited on MCMB as an anode material for lithium ion batteries," J. Mater. Chem. 11(5): 1502-1505 (2001).

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society 154(3): A168-A172 (2007).

Sun et al., "Significant improvement of high voltage cycling behavior AlF3-coated LiCoO2 cathode," Electrochemistry Communications 8: 821-826 (2006).

Thackeray et al., "Comments on the structural complexity of lithium-rich Li1+xM1-xO2 electrodes (M=Mn,Ni,Co) for lithium batteries," Electrochemistry Communications 8: 1531-1538 (2006).

Woo et al., "Significant Improvement of Electrochemical Performance of AlF3-Coated Li[Ni0.8Co0.1Mn0.1]O2 Cathode Materials," J. of the Electrochemical Society 154(11): A1005-A1009 (2007).

Yakovleva et al., "Stabilized Lithium Metal Powder, Enabling Material and Revolutionary Technology for High Energy Li-ion Batteries" 2010 DOE Vehicle Technologies Program Review (Presentation, 34 pages).

Yang et al., "Nanosized silicon-based composite derived by in situ mechanochemical reduction for lithium ion batteries," Journal of Power Sources 164: 880-884 (2007).

Yoshio et al., "Electrochemical behaviors of silicon based anode material," Journal of Power Sources 146: 10-14 (2005).

"For More Charge Use Li, for Maximum Charge, Use FMC's SLMP™ Technology," Product Brochure, FMC Corporation 2008 (1 page).

International Search Report from co-pending application PCT/US2012/072292 dated Oct. 8, 2013.

Wang et al., "Lithium Insertion in Carbon—Silicon Composite Materials Produced by Mechanical Milling," J. Electrochem. Soc., 145(8):2751-2758 (1998).

Ruffo et al., "Impedance Analysis of Silicon Nanowire Lithium Ion Battery Anodes," J. Phys. Chem. C 113:11390-11398 (2009).

Office Action from corresponding Taiwan Patent App. No. 102101856, date of completion May 14, 2014.

\* cited by examiner

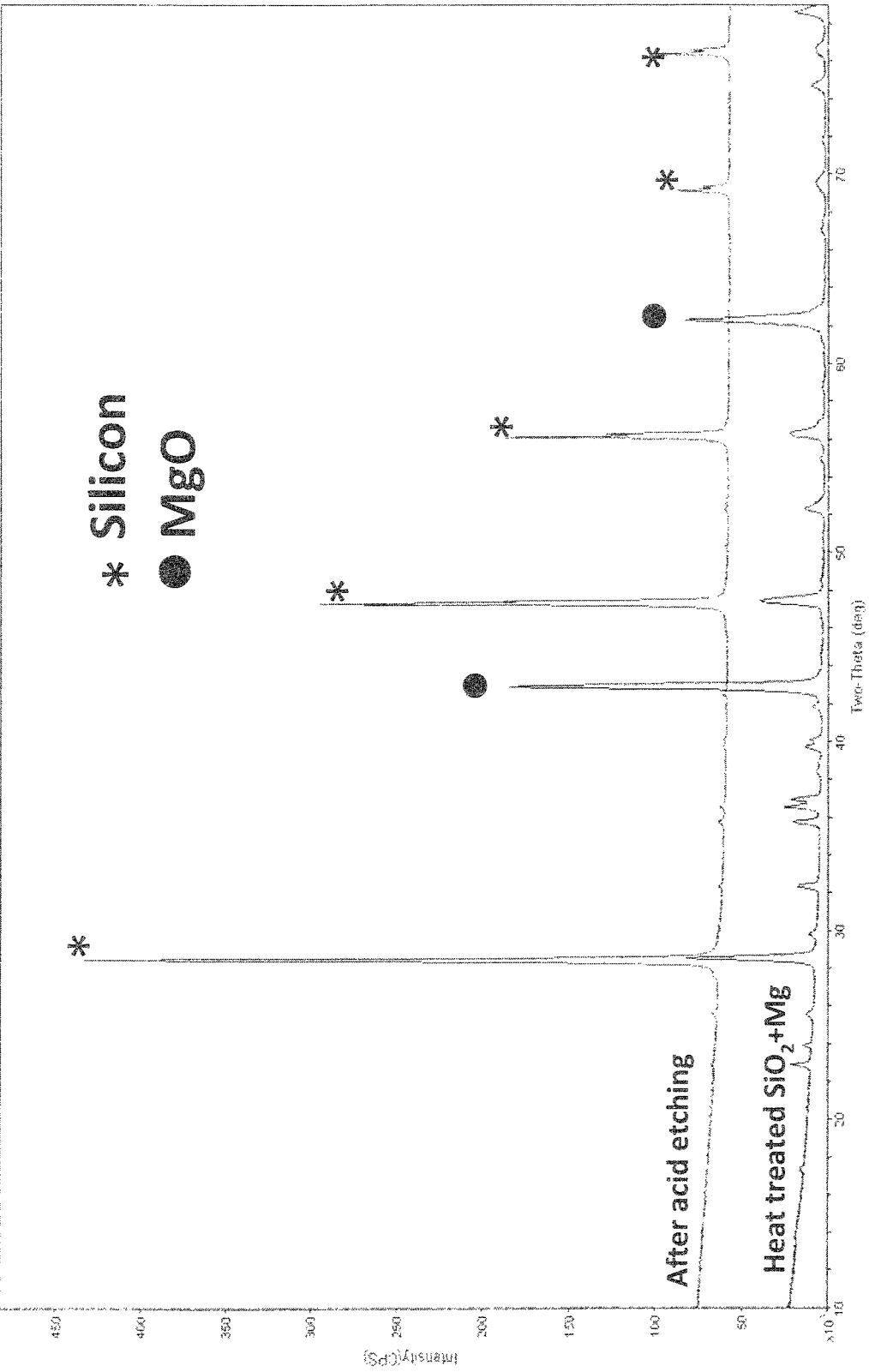

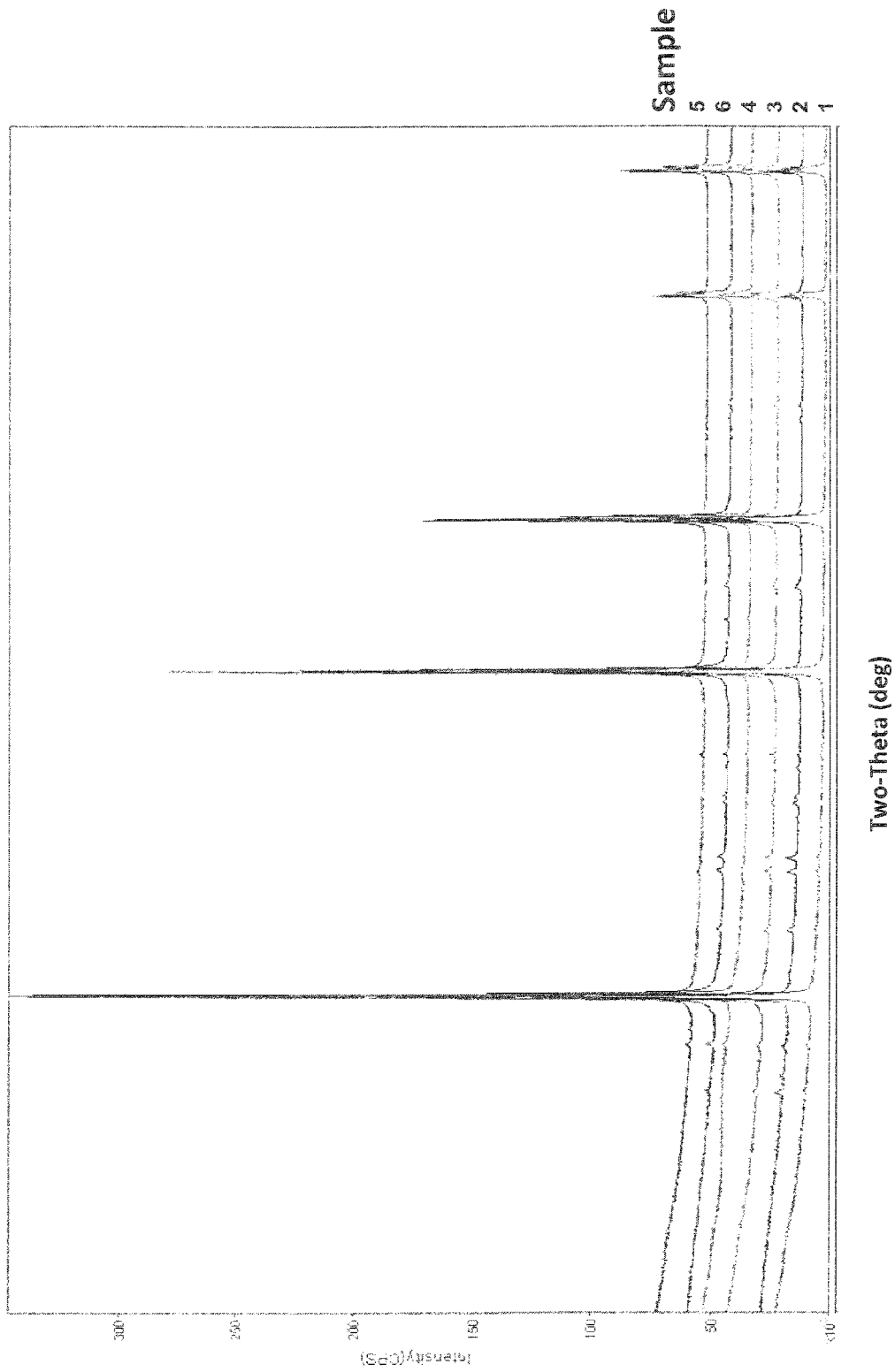

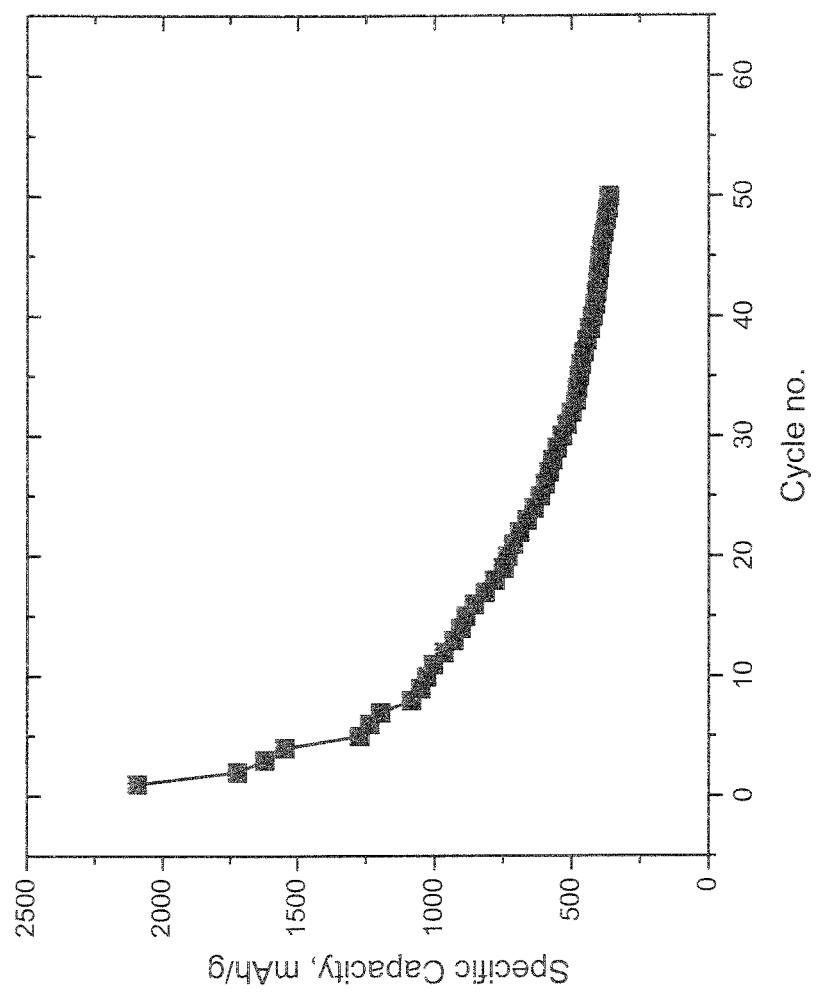

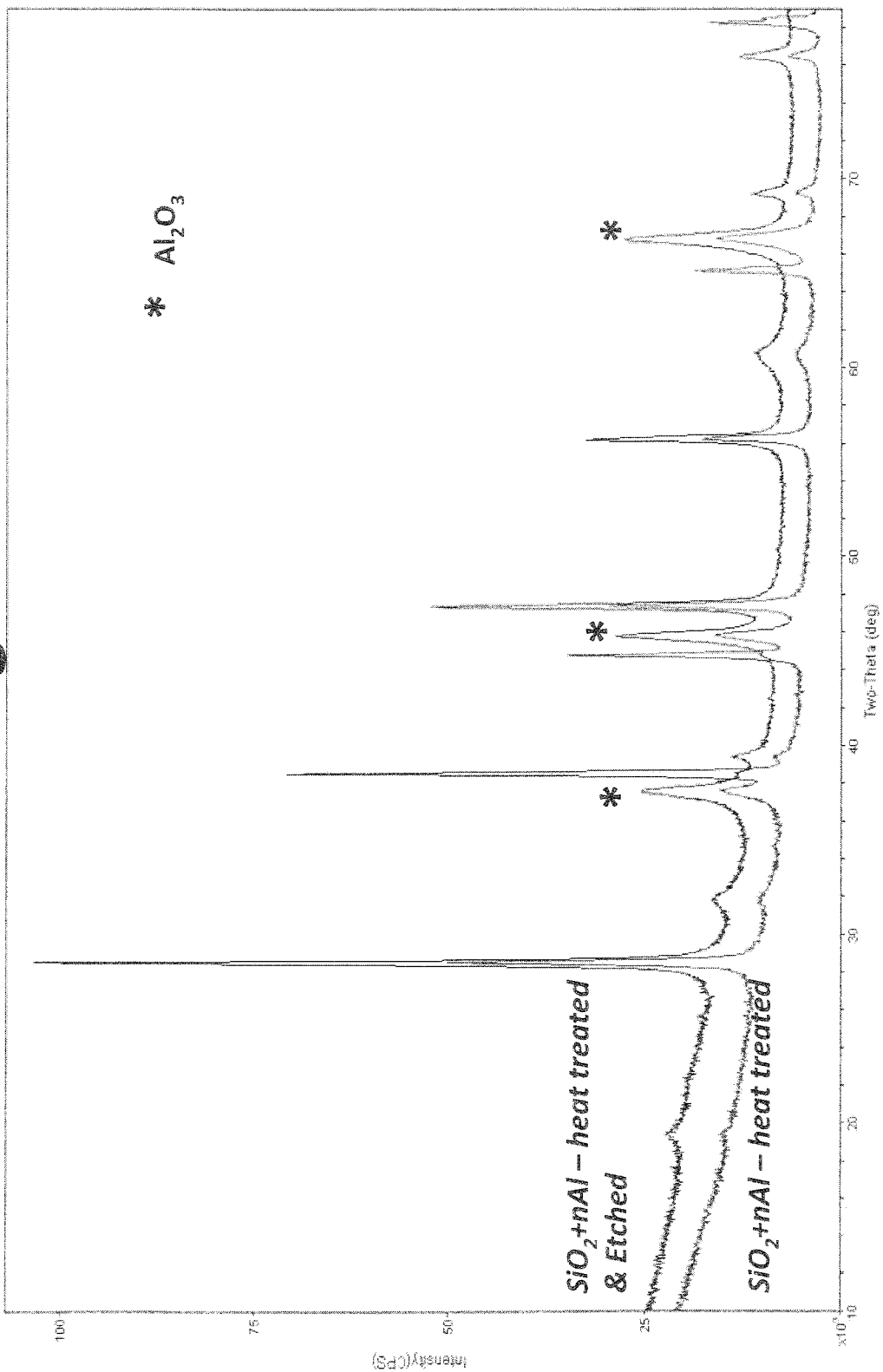

POROUS SILICON BASED ANODE MATERIAL FORMED USING METAL REDUCTION

GOVERNMENT RIGHTS

Development of the inventions described herein was at least partially funded with government support through U.S. Department of Energy grant ARPA-E-DE-AR0000034, and the U.S. government has certain rights in the inventions.

BACKGROUND OF THE INVENTION

Lithium batteries are widely used in consumer electronics due to their relatively high energy density. For some current commercial batteries, the negative electrode material can be graphite, and the positive electrode materials can comprise lithium cobalt oxide ($LiCoO_2$), lithium manganese oxide ($LiMn_2O_4$), lithium iron phosphate ($LiFePO_4$), lithium nickel oxide ($LiNiO_2$), lithium nickel cobalt oxide ($LiNiCoO_2$), lithium nickel cobalt manganese oxide ($LiNiMnCoO_2$), lithium nickel cobalt aluminum oxide ($LiNiCoAlO_2$) and the like. For negative electrodes, lithium titanate is an alternative to graphite with good cycling properties, but it has a lower energy density. Other alternatives to graphite, such as tin oxide and silicon, have the potential for providing increased energy density. However, some high capacity negative electrode materials have been found to be unsuitable commercially due to high irreversible capacity loss and poor discharge and recharge cycling related to structural changes and anomalously large volume expansions, especially for silicon, that are associated with lithium intercalation/alloying. The structural changes and large volume changes can destroy the structural integrity of the electrode, thereby decreasing the cycling efficiency.

New positive electrode active materials are presently under development that can significantly increase the corresponding energy density and power density of the corresponding batteries. Particularly promising positive electrode active materials are based on lithium rich layered-layered compositions. In particular, the improvement of battery capacities can be desirable for vehicle applications, and for vehicle applications the maintenance of suitable performance over a large number of charge and discharge cycles is important.

SUMMARY OF THE INVENTION

In a first aspect, the invention pertains to a porous silicon based material. The porous silicon based material comprises porous crystalline elemental silicon that has a crystalline silicon peak at a 2θ value of 28 to 30 degrees from an x-ray diffraction (XRD) spectrum, using a Cu Kα source. In general, the porous silicon based material has an average pore sizes in the range of 5 nm to 500 nm in diameter. In some embodiments, the crystalline silicon peak of the XRD has at least twice the peak intensity compared to broad amorphous scattering intensity at a 2θ of 15 to 25 degrees. The porous silicon based material can have an x-ray diffraction spectrum with a broad monotonically decreasing amorphous scattering from 2θ of 10 to 25 degrees. In some embodiments, the crystalline silicon peak is at least four times of the greatest intensity from the amorphous phase scattering at a 2θ of 15 to 25 degrees. The porous silicon generally is substantially free of carbon embedded within the silicon structure. In some embodiments, the average pore size is from about 15 nm to about 200 nm. In additional or alternative embodiments, the porous silicon based material can further comprise a carbon coating on the porous silicon. The porous silicon can have a surface area from about 10 $m^2/g$ to about 200 $m^2/g$.

In a second aspect, the invention pertains to an electrode that comprises a binder and the porous silicon based material described herein. The electrode has a discharge specific capacity of at least 1800 mAh/g at the 7th cycle at rate of C/3 discharged from 1.5V to 0.005V against lithium. In some embodiments, the electrode has a first cycle irreversible capacity loss of less than 30%. The electrode of can retain at least 80% of capacity up to 50 charge/discharge cycles. The binder used in the electrode can be a polyimide binder.

In a third aspect, the invention pertains to a lithium ion battery that comprises a negative electrode comprising the porous silicon based material described herein, a positive electrode that has a discharge specific capacity of at least 200 mAh/g at rate of C/3 comprising a lithium metal oxide approximately represented by the formula $Li_{1+b}Ni_\alpha Mn_\beta Co_\gamma A_\delta O_{2-z}F_z$, where b ranges from about 0.01 to about 0.3, α ranges from about 0 to about 0.4, β ranges from about 0.2 to about 0.65, γ ranges from 0 to about 0.46, δ ranges from 0 to about 0.15 and z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V, Li or combinations thereof, and a separator between the negative electrode and the positive electrode. The battery can retain about 90% of the battery capacity over 50 cycles relative to the 6th cycle at discharge rate of C/3. In some embodiments, the battery further comprises supplemental lithium.

In a fourth aspect, the invention pertains to a porous silicon based material comprising porous crystalline elemental silicon and having an average pore sizes in the range of 5 nm to 500 nm in diameter and a discharge specific capacity of at least 1800 mAh/g at the 7th cycle at rate of C/3 discharged from 1.5V to 0.005V against lithium. In some embodiments, the porous silicon based material further comprises a carbon coating on the porous crystalline elemental silicon. The porous silicon based material can further comprise carbon nanofibers (CNF) blended with the porous crystalline elemental silicon.

In a fifth aspect, the invention pertains to a method of forming porous crystalline elemental silicon (the porous silicon). The method comprises the steps of reducing a blend of silicon dioxide and a reducing metal at a target temperature from about 550° C. to about 950° C. to form an intermediate comprising crystalline elemental silicon and metal oxide. The target temperature for example can be reached by using a gradual temperature heating ramp at a ramp rate of about 0.5° C./min to about 20° C./min to reach the target temperature. In some embodiment, the heating process is performed by gradual temperature ramps with a ramp rate of about 0.5° C./min to about 20° C./min with one or more temperature steps to reach the target temperature. The heating can be paused for about 15 min to about 1.5 hours at the temperature step. The intermediate can then be etched with an acid to remove the metal oxide to form the porous crystalline elemental silicon. The blend of silicon dioxide and reducing metal can be fanned by milling the silicon dioxide and a powder of the reducing metal. For example, the reducing metal powder can be ball milled with the silicon dioxide for 1 hour to 10 hours at 100 RPM to 500 RPM. In some embodiment, the porous silicon is substantially free of carbon. The reducing metal can comprise Li, Na, K, Rb, Cs, Be, Mg, Ca, Sr, Ba, Al, Ni, Zr, or a combination thereof. The acid can be hydrochloric acid, sulfuric acid, phosphoric acid, acetic acid, nitric acid, or a combination thereof. In some embodiment, the acid etching step is accompanied by heating. In some embodiment, the porous silicon can be milled with carbon nanofibers (CNF) to form a silicon-CNF composite material. In some embodiment, the porous silicon can be coated with a carbon coating to form a porous silicon based material.

BRIEF DESCRIPTION OF THE DRAWINGS

FIG. 4 shows the XRD patterns of Si/MgO composite and the porous silicon obtained after acid treatment.

FIG. 5 shows the XRD patterns of porous silicon samples 1-6 of Table 1.

FIG. 6b shows the specific capacity versus cycle numbers of the batteries formed from a commercial silicon nanoparticle based material.

FIG. 9 shows XRD patterns of patterns of $Si/Al_2O_3$ composite synthesized from aluminum reduction and the porous silicon obtained after acid treatment containing significant amount of $Al_2O_3$.

DETAILED DESCRIPTION OF PREFERRED EMBODIMENTS

Figure 1:
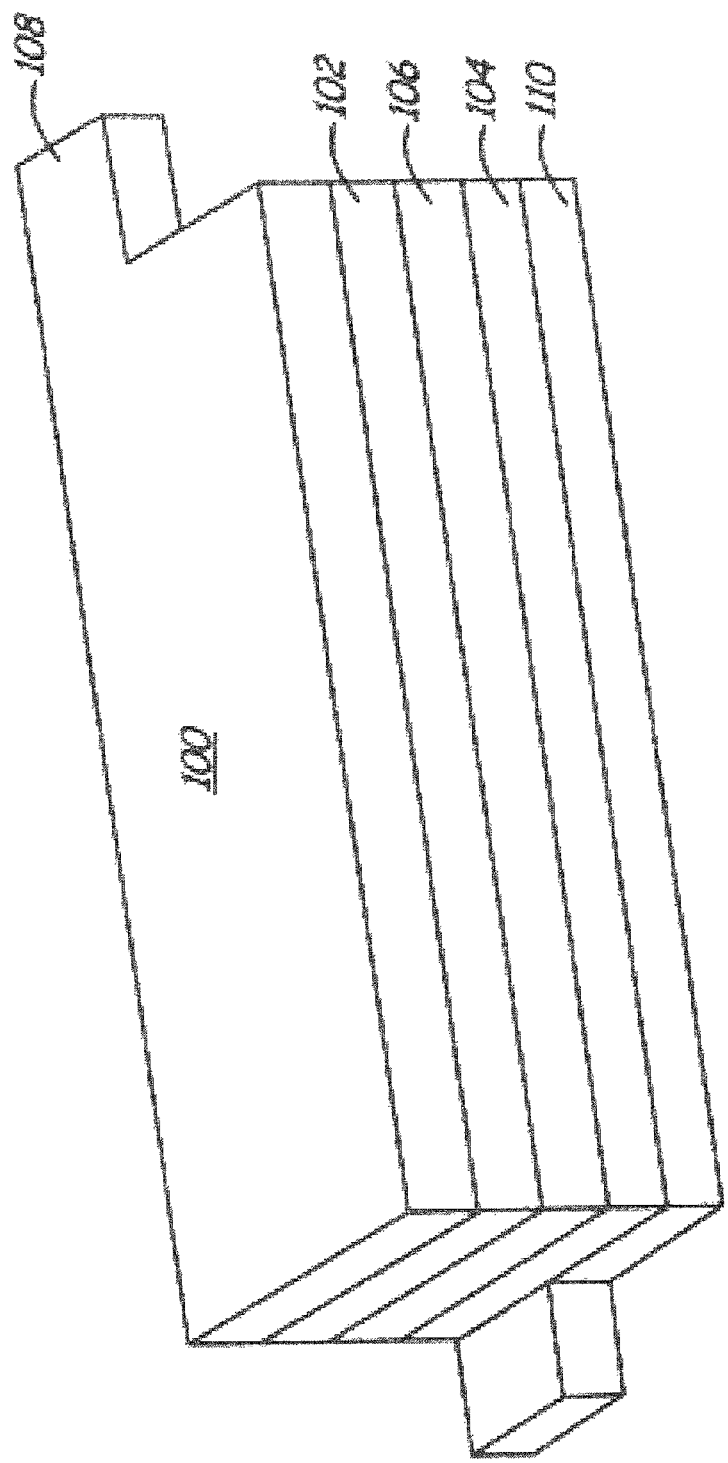
FIG. 1 is a schematic perspective view of an electrode stack useful for the formation of a battery.

Highly porous silicon based materials have been developed as desirable negative electrode materials for lithium ion batteries. In particular, porous silicon based material is formed using metal reduction, which in some embodiments comprises gradual heating followed by acid etching to produce porous silicon (pSi) based material. In some embodiments, the pSi based material generally is substantially free of elemental carbon within the nanostructured material and can have surface area from about 10 $m^2/g$ to about 200 $m^2/g$. While the pSi nanostructured material is substantially free of carbon, an electrode formed from the pSi based material can comprise a carbon component, such as a nano-scale carbon (e.g., nanotubes, fibers or particles), graphitic carbon and/or a pyrolytic carbon coating to provide an electrically conductive diluent. Desirable pyrolytic carbon coatings can be formed from organic compositions that can be applied with a solvent to obtain a relatively uniform coating prior to and after pyrolyzing the organic composition to form the carbon coating. An elemental metal coating can be applied as an alternative to a carbon coating. The pSi based material can have specific capacity of at least 1800 mAh/g when cycled at C/3 rate. The pSi based material can be used to construct pSi based electrodes that have high electrode loading levels of at least 3 $mg/cm^2$. The pSi based material can be used to construct batteries with either a lithium metal counter electrode or a high capacity lithium rich positive electrode material based counter electrode. The pSi based materials can be effectively cycled with a high capacity lithium rich positive electrode active material. The resulting lithium ion batteries can have high specific capacities for both the negative electrode active material and the positive electrode active material. In some embodiments, corresponding lithium ion batteries can comprise supplemental lithium that can serve several purposes. In particular, supplemental lithium can compensate for relatively large irreversible capacity losses from a silicon-based negative electrode as well as stabilizing high capacity lithium rich positive electrode active materials. The pSi based material can be used in automobile batteries, such as for electric vehicles, plug-in hybrid vehicles and hybrid vehicles.

Lithium has been used in both primary and secondary batteries. An attractive feature of lithium metal for battery use is its light weight and the fact that it is the most electropositive metal, and aspects of these features can be advantageously captured in lithium-based batteries also. Certain forms of metals, metal oxides, and carbon materials are known to incorporate lithium ions into the material through intercalation, alloying or similar mechanisms. Lithium ion batteries generally refer to batteries in which the negative electrode active material is also a lithium intercalation/alloying material. If lithium metal itself is used as the anode, the resulting battery generally is referred to as a lithium battery. Desirable lithium rich mixed metal oxides are described further herein to function as electroactive materials for positive electrodes in secondary lithium ion batteries, although the desirable anode material described herein can be effectively used with other positive electrode active materials. Lithium batteries can initially cycle with good performance, but dendrites can form upon lithium metal deposition that eventually can breach the separator and result in failure of the battery. As a result, commercial lithium-based secondary batteries have generally avoided the deposition of lithium metal through the use of a negative electrode active material that operates through intercalation/alloying or the like above the lithium deposition voltage and with a slight excess in negative electrode capacity relative to the cathode or positive electrode.

The batteries described herein are lithium-based batteries in which a non-aqueous electrolyte solution comprises lithium ions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Similarly, the anode (negative electrode) undergoes the opposite reactions from the cathode to maintain charge neutrality. Unless indicated otherwise, performance values referenced herein are at room temperature, i.e., about 25° C.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form, i.e. elemental metal or a corresponding alloy of the metal's elemental form, i.e. metal alloy. In other words, a metal oxide or other metal composition, other than metal alloys, generally is not metallic.

When lithium ion batteries are in use, the uptake and release of lithium from the positive electrode and the negative electrode induces changes in the structure of the electroactive material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss (IRCL) is the difference between the charge capacity of the new battery and the first discharge capacity. The irreversible capacity loss results in a corresponding decrease in the capacity, energy and power for the cell due to changes in the battery materials during the initial cycle. The degradation of performance with cycling can have contributions from the positive electrode, the negative electrode, the electrolyte, the separator or combinations thereof. New compositions of positive electrode active materials can be cycled with a relatively high capacity. Thus, it is desirable for anode material used in corresponding batteries to have high capacity also. It is useful to note that during charge/discharge measurements, the specific capacity of a material depends on the rate of discharge. The highest specific capacity of a particular material is measured at very slow discharge rates. In actual use, the actual specific capacity is less than the maximum value due to discharge at a faster rate. More realistic specific capacities can be measured using reasonable rates of discharge that are more similar to the rates encountered during actual use. For example, in low to moderate rate applications, a reasonable testing rate involves a discharge of the battery over three hours. In conventional notation this is written as C/3 or 0.33 C. Faster or slower discharge rates can be used as desired, and the rates can be described with the same notation.

The porous, crystalline elemental silicon material described herein can be characterized by the material's nanostructure and by its high degree of crystallinity. The nanostructure of the material results in a high BET surface area and particular pore sizes and distribution of sizes, although the materials generally do not have primary particles visible in electron micrographs. In particular, the pores themselves define the nanostructure without visible nanoparticles surrounding the pores. While not wanting to be limited by theory, the nanostructuring without visible primary particles contributing to the formation of the pores may result in a stronger structure that can cycle in the resulting battery with reduced collapse of the structure due to the volume changes associated with the incorporation of lithium to form a silicon lithium alloy and release of lithium. While the pores may have desired structural stability, the pores seem to also provide for accommodation of the volume changes associated with the battery cycling. As a result, the porous silicon materials described herein are observed to have good cycling while maintaining a high specific capacity.

The nanostructured elemental silicon material can be synthesized through the reduction of silicon oxide using a reducing metal, generally in powder form. In some embodiments, commercial $SiO_2$ (i.e., silica) can be used as a starting material. The reducing metal powder can comprise magnesium metal or aluminum metal. The silica and reducing metal powder can be combined and subjected to high energy milling to intimately mix the materials. The mixed materials can then be subjected to a heat treatment, e.g., over 500° C., generally under an oxygen deficient atmosphere. The silicon oxide is reduced in the process to elemental silicon and the original reducing metal is converted to an oxidized form of the metal. It can be desirable to remove the product metal oxide. In particular, the product metal oxide generally is inert weight in the electrode that is also electrically insulating, such that its presence can increase the weight and internal electrical resistance in the electrode. Also, removal of the product inert metal oxide can contribute to the porosity of the nanostructured silicon and correspondingly increase the BET surface area.

The resulting material can be characterized by x-ray diffraction. In particular, x-ray diffraction peaks characteristic of crystalline silicon are observed. Broad smaller intensity scattering is observed at smaller scattering angles that are indicative of amorphous components. Generally, the low angle scattering monotonically decreases from around a value of $2\theta$ equal to 10 degrees at larger angles. Also, there generally is no visible broad peak reminiscent of amorphous silicon oxide ($SiO_2$) between values of $2\theta$ of 15-25 degrees.

The processing conditions are found to influence the specific properties of the product material. For example, the ramp speed of the heating process can influence significantly the properties of the product material. In particular, it has been found that materials with a very large surface area do not cycle well in a resulting lithium ion battery. The very high surface area, such as greater than 100 $m^2/g$, presumably corresponds with a very high degree of porosity. While not wanted to be limited by theory, the results below suggest that excessive porosity results in a fragile structure that can be damaged by cycling in the battery. In summary, the nanostructured materials formed from the reduction reactions described herein form a very stable structure that can accommodate the volume changes associated with silicon-lithium alloying and de-alloying as lithium is taken up and released during battery cycling, but excessive porosity in the nanostructured material results in a weakening of the structure that is deleterious to the stability of the structure so that the material exhibits diminished cycling stability if the surface area of the nanostructured material is excessive.

As described herein with respect to some embodiments, the pSi based material can be formed into composites with carbon and/or alloys with other metal elements. The objective for the design of improved silicon-based materials is to further stabilize the negative electrode materials over cycling while maintaining a high specific capacity and in some embodiments reducing the irreversible capacity loss in the first charge and discharge cycle. As described herein, pyrolytic carbon coatings as well as carbon nano fibers are observed to reduce IRCL of pSi based materials during the initial charge/discharge cycles of batteries.

With respect to the composite materials, the pSi based material can be combined with carbon based materials such as carbon nanoparticles, carbon nanotubes and/or carbon nanofibers. The materials can be intimately associated via, for example, high energy mechanical milling (HEMM). In additional or alternative embodiments, the pSi based material can be milled with metal powders to form silicon-metal composites, which may have a corresponding nanostructure. Carbon materials can be additionally combined with the silicon-metal composites to form multi-component composites.

Desirable carbon coatings can be formed on the pSi based material by pyrolyzing organic compositions. The organic composition can be organic polymers, some lower molecular solid organic compositions and the like that can be pyrolyzed at relatively high temperatures, e.g., about 800° C. to about 900° C., to form a hard amorphous carbon coating. In some embodiments, the desired organic compositions can be dissolved in a suitable solvent, such as water and/or volatile organic solvents to form a solution. The pSi based material is then added to the solution and mixed well to form a dispersion. After drying the dispersion to remove the solvent, the resultant mixture can be heated in an oxygen free atmosphere to pyrolyze the organic composition to form the hard amorphous carbon coating on the pSi based material. The resulting product is a carbon-silicon composite that comprises the pSi based material coated with pyrolytic carbon. The carbon coating can lead to surprisingly significant improvement in the performance of the resulting composite material. Environmentally friendly organic compositions, such as sugars and citric acid, have been found to be desirable precursors for the formation of pyrolytic carbon coatings. Elemental metal coatings, such as silver or copper, can be applied as an alternative to a pyrolytic carbon coating to provide electrical conductivity and to stabilize the pSi based material. The elemental metal coatings can be applied through solution based reduction of a metal salt.

The high capacity silicon based materials are of particular value in combination with a high capacity positive electrode active material. Generally, the anode and cathode are relatively balanced so that the battery does not involve significant waste with associated cost of unused electrode capacity as well as for the avoidance of corresponding weight and volume associated with unused electrode capacity. It can be possible to get high capacity results simultaneously for both electrodes in the lithium ion battery. Furthermore, cycling capacity of both electrodes can independently fade, and the capacities of both electrodes are subject to irreversible capacity loss. The positive electrodes with lithium rich layered-layered compositions can exhibit a significant first cycle irreversible capacity loss. However, high capacity silicon-based anodes can generally exhibit contributions to IRCL significantly greater than the positive electrode active material. The design of the negative electrode active materials can be selected to reduce the IRCL, which can be significant with respect to reducing the excess anode balance in the cell design. Also, the positive electrode active material can similarly be designed to reduce IRCL associated with the positive electrode. Furthermore, supplemental lithium can be used as a substitute for additional capacity of the positive electrode to compensate for the relatively large IRCL of the negative electrode. With appropriate stabilization of the negative electrode and positive electrode, a battery with high capacity materials in both electrodes can exhibit high specific capacities for both electrodes over at least a moderate number of cycles.

The overall performance of the battery is based on the capacities of both the negative and positive electrodes and their relative balance. Supplemental lithium can replace at least part of the lithium that does not cycle due to an irreversible capacity loss of the negative electrode. Furthermore, it has been discovered that the inclusion of supplemental lithium can stabilize positive electrodes based on lithium rich layered-layered lithium metal oxide compositions out to large number of cycles. This improvement in cycling of the positive electrode active material is described in copending U.S. patent application Ser. No. 12/938,073 to Amiruddin et al., entitled "Lithium Ion Batteries With Supplemental Lithium," (hereinafter "the '073 application") incorporated herein by reference. The benefit of supplemental lithium to batteries with high capacity anode material that have carefully balanced negative and positive electrode capacities is discussed in copending U.S. patent application Ser. No. 12/938,951 to Lopez et al. (the '951 application), entitled "High Capacity Anode Materials for Lithium Ion Batteries" and Ser. No. 13/108,708 to Deng et al. (the '708 application), entitled: "Silicon oxide based high capacity anode materials for lithium ion batteries", both incorporated herein by reference.

Battery Structure

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104. The stack of electrodes with their associated current collectors and separator are generally placed within a container with the electrolyte. In general, the lithium ion battery described herein comprises a positive electrode comprising a lithium intercalation material and a negative electrode comprising a lithium intercalation/alloying material.

The nature of the positive electrode active material and the negative electrode active material influences the resulting voltage of the battery since the voltage is the difference between the half cell potentials at the cathode and anode. Suitable positive electrode active materials are described below, and the materials of particular interest are lithium metal oxides. Generally, suitable negative electrode lithium intercalation/alloying compositions can include, for example, graphite, synthetic graphite, coke, fullerenes, other graphitic carbons, niobium pentoxide, tin alloys, silicon, silicon alloys, silicon-based composites, titanium oxide, tin oxide, and lithium titanium oxide, such as $Li_xTiO_2$, $0.5<x\leq1$ or $Li_{1+x}Ti_{2-x}O_4$, $0\leq x\leq 1/3$. However, as described herein, improved negative electrode active materials have been formed through the reduction of silicon oxide with a metal reducing agent. Silicon based active materials take up lithium to form an alloy and release lithium from the alloy to correspondingly release lithium. Negative electrode active materials of particular interest are described in detail below.

The positive electrode active compositions and negative electrode active compositions generally are powder compositions that are held together in the respective electrode with a polymer binder. The binder provides ionic conductivity to the active particles when in contact with the electrolyte. Suitable polymer binders include, for example, polyvinylidine fluoride (PVDF), polyethylene oxide, polyimide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. In particular, thermally curable polyimide polymers have been found desirable, which may be due to their high mechanical strength. The following table provides suppliers of polyimide polymers, and names of corresponding polyimide polymers.

| Supplier | Binder |
| --- | --- |
| New Japan Chemical Co., Ltd. | Rikacoat PN-20; Rikacoat EN-20; Rikacoat SN-20 |
| HD MicroSystems | PI-2525; PI-2555; PI-2556; PI-2574 |
| AZ Electronic Materials | PBI MRS0810H |
| Ube Industries. Ltd. | U-Varnish S; U-Varnish A |
| Maruzen petrochemical Co., Ltd. | Bani-X (Bis-allyl-nadi-imide) |
| Toyobo Co., Ltd. | Vyromax HR16NN |

With respect to polymer properties, some significant properties for electrode application are summarized in the following table.

| Binder | Elongation | Tensile Strength (MPa) | Elastic Modulus | Viscosity (P) |
| --- | --- | --- | --- | --- |
| PVDF | 5-20% | 31-43 | 160000 psi | 10-40 |
| Polyimide | 70-100% | 150-300 | | 40-60 |
| CMC | 30-40% | 10-15 | | 30 |

PVDF refers to polyvinylidene fluoride, and CMC refers to sodium carboxy methyl cellulose. The elongation refers to the percent elongation prior to tearing of the polymer. In general, to accommodate the silicon based materials, it is desirable to have an elongation of at least about 50% and in further embodiments at least about 70%. Similarly, it is desirable for the polymer binder to have a tensile strength of at least about 100 MPa and in further embodiments at least about 150 MPa. Tensile strengths can be measured according to procedures in ASTM D638-10 Standard Test Method for Tensile Properties of Plastics, incorporated herein by reference. A person of ordinary skill in the art will recognize that additional ranges of polymer properties within the explicit ranges above are contemplated and are within the present disclosure. The particle loading in the binder can be large, such as greater than about 80 weight percent. To form the electrode, the powders can be blended with the polymer in a suitable liquid, such as a solvent for the polymer. The resulting paste can be pressed into the electrode structure.

The active particle loading in the binder can be large, such as greater than about 80 weight percent, in further embodiments at least about 83 weight percent and in other embodiments from about 85 to about 97 weight percent active material. A person of ordinary skill in the art will recognize that additional ranges of particles loadings within the explicit ranges about are contemplated and are within the present disclosure. To form the electrode, the powders can be blended with the polymer binder in a suitable liquid, such as a solvent for the polymer binder. The resulting paste can be pressed into the electrode structure.

The positive electrode composition, and in some embodiments the negative electrode composition, generally can also comprise an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, an electrode can comprise from about 1 weight percent to about 25 weight percent, and in further embodiments from about 2 weight percent to about 20 weight percent and in other embodiments from about 3 weight percent to about 15 weight percent distinct electrically conductive powder. A person of ordinary skill in the art will recognize that additional ranges of amounts of electrically conductive powders within the explicit ranges above are contemplated and are within the present disclosure.

Each electrode generally is associated with an electrically conductive current collector to facilitate the flow of electrons between the electrode and an exterior circuit. A current collector can comprise a metal structure, such as a metal foil or a metal grid. In some embodiments, a current collector can be formed from nickel, aluminum, stainless steel, copper or the like. An electrode material can be cast as a thin film onto a current collector. The electrode material with the current collector can then be dried, for example in an oven, to remove solvent from the electrode. In some embodiments, a dried electrode material in contact with a current collector foil or other structure can be subjected to a pressure from about 2 to about 10 kg/cm² (kilograms per square centimeter).

The separator is located between the positive electrode and the negative electrode. The separator is electrically insulating while providing for at least selected ion conduction between the two electrodes. A variety of materials can be used as separators. Commercial separator materials can be formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the fire risk. The polymer-ceramic composites for separator materials are described further in U.S. Pat. No. 7,351,494 to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

The electrolyte provides for ion transport between the anode and cathode of the battery during the charge and discharge processes. We refer to solutions comprising solvated ions as electrolytes, and ionic compositions that dissolve to form solvated ions in appropriate liquids are referred to as electrolyte salts. At least some of the irreversible capacity loss can be attributed to the formation of a solvent electrolyte interphase layer associated with the electrodes, and in particular with the negative electrode. Electrolytes for lithium ion batteries can comprise one or more selected lithium salts. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride, lithium difluoro oxalato borate, and combinations thereof. Traditionally, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol)dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in published U.S. patent applications 2011/0136019 to Amiruddin et al. entitled: "Lithium ion battery with high voltage electrolytes and additives", incorporated herein by reference.

The porous silicon based material described herein can be incorporated into various commercial battery designs such as prismatic shaped batteries, wound cylindrical batteries, coin cell batteries, or other reasonable battery shapes. The batteries can comprise a single pair of electrodes or a plurality of pairs of electrodes assembled in parallel and/or series electrical connection(s). While the materials described herein can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used, as well as prismatic cells and foil pouch batteries of selected sizes.

Pouch cell batteries can be particularly desirable for vehicle applications due to stacking convenience and relatively low container weight. A desirable pouch battery design for vehicle batteries incorporating a high capacity cathode active materials is described in detail in published U.S. patent applications 2009/0263707 to Buckley et al, entitled "High Energy Lithium Ion Secondary Batteries" and copending U.S. patent application Ser. No. 13/195,672 to Kumar et al. (the '672 application), entitled "Battery Packs for Vehicles and High Capacity Pouch Secondary Batteries for Incorporation into Compact Battery Packs," both incorporated herein by reference. While the pouch battery designs are particularly convenient for use in specific battery pack designs, the pouch batteries can be used effectively in other contexts as well with high capacity in a convenient format.

Porous Silicon Based Negative Electrode Active Materials

Porous silicon is described herein that can stably cycle at high capacity. The porous silicon can be formed from the reduction of silicon oxide using an appropriate metal reducing agent. The resulting porous silicon can have a particular morphology that seems to particularly contribute to the excellent cycling properties. Elemental silicon has attracted significant amount of attention as a potential negative electrode material due to its very high specific capacity with respect to intake and release of lithium. Silicon forms an alloy with lithium, which can theoretically have a lithium content corresponding with more than 4 lithium atoms per silicon atom (e.g., $Li_{4.4}Si$). Thus, the theoretical specific capacity of silicon is on the order of 4000-4400 mAh/g, which is significantly larger than the theoretical capacity of about 370 mAh/g for graphite. For comparison, graphite is believed to intercalate lithium to a level of roughly 1 lithium atom for 6 carbon atoms ($LiC_6$). Also, elemental silicon, silicon alloys, silicon composites and the like can have a low potential relative to lithium metal similar to graphite. However, silicon undergoes a very large volume change upon alloying with lithium. A large volume expansion on the order of two to three times of the original volume or greater has been observed for particulate silicon, and the large volume changes have been correlated with a significant decrease in the cycling stability of batteries having silicon-based negative electrodes. The highly porous silicon materials described herein have been observed to accommodate the cycling without a significant decrease in the performance properties, presumably due to the morphology of the materials.

Also, elemental silicon in a negative electrode of a lithium-based battery is observed to have a large irreversible capacity loss (IRCL) in the first charge/discharge cycle of the battery. The high IRCL of a silicon-based anode can consume a significant portion of the capacity available for the battery's energy output. Since the cathode, i.e., positive electrode, supplies all of the lithium in a traditional lithium ion battery, a high IRCL from the anode, i.e., negative electrode, can result in a low energy battery. In order to compensate for the large anode IRCL, excess cathode material can be used to supply the extra lithium and properly balance the cell. To decrease the use of large excesses of lithium metal oxide in the cathode to compensate for the IRCL of the anode, supplemental lithium has been found to provide compensation of the IRCL as well as to improve the cycling performance generally of the batteries.

Nanostructure silicon based material with nanoscale pores having few or no submicron visible primary particles were not known to be obtainable without embedded nano-carbon components. In some embodiments, the pore diameters can be bigger than the wall thicknesses of the pores. Nanostructured silicon or silicon oxide has been explored in the '951 application and the '708 application referenced above respectively as high capacity negative electrode materials that has relatively low IRCL. The general formation of porous silicon based on the formation of a metal alloy and elution of the non-silicon metal is described in published U.S. patent application 2004/0214085 to Sheem et al. (the '085 application) entitled: "Negative Active Material for Rechargeable Lithium Battery, Method of Preparing same, and rechargeable lithium battery," incorporated herein by reference. The formation of an alloy and subsequent leaching would not be expected to result in the formation of large structurally stable pores as described herein. The formation of large stable pores of the current material can be associated with the accommodation of the structural changes accompanying lithium alloying and release. The corresponding good performance would not be expected to follow from the material of the '085 application, and the material is not well characterized in the '085 application.

Additionally, formation of porous silicon using reducing metal process has been disclosed in published U.S. Patent Applications 2009/0029256 to Mah et al. (the '256 application) entitled: "Si/C composite, anode active materials, and lithium battery including the same", and in Korean Patent No. KR10-0493960 to LG Chemical Ltd (the '960 patent), all incorporated herein by reference. The '256 application teaches the formation of a carbon-silicon dioxide composite prior to the addition of the reducing metal. Amorphous carbon is visible in the x-ray diffractogram of the product material. The resulting structure of the materials in the '256 application have carbon integrated intrinsically within the structure, which can be expected to influence the resulting performance of the materials in a fundamental way. The cycling of materials in the '256 application do not exhibit the superior cycling properties exhibited by the materials in the present application.

The '960 patent teaches reduction of silicon oxide with alkali or alkali earth metals, and exemplifies reduction with magnesium. The materials produced by the procedures of the '960 patent result in a material with a large, broad amorphous peak in the x-ray diffractogram with a peak intensity at around $2\theta$ of about 18-20. It is unclear if this significant component of the material is unreacted silicon oxide or amorphous silicon. In any case, the large amorphous component is expected to significantly influence the corresponding performance such that the excellent performance described herein would not be achieved. The difference in material is further emphasized by the appearance of the material in micrographs. The material of the '960 patent have a visible particulate nature on the same scale as the porosity that is not observed in the materials of the present application.

Desirable high capacity negative electrode active materials can be based on porous silicon (pSi) based materials and/or composites of the porous silicon based materials. Electrodes constructed with the pSi based materials and/or composites are generally referred to as pSi based electrodes. In general, the pSi based material is highly crystalline and has a high surface area and a high void volume relative to bulk silicon. Based on the procedures described herein, the reaction of the silicon oxide is approximately complete. Also, in some embodiments, the reaction is not performed in the presence of carbon or other non-reactive conductive material, although the porous silicon can be formed into complexes with a conductive material after it is formed. Thus, the porous silicon as formed has a low composition of amorphous material as measured by x-ray diffraction.

It is found with the porous silicon formed as described herein the material is structured on a generally submicron scale with a high degree of porosity within larger scale particulates. Thus, the pores can have relatively smooth walls separating the pores in a porous network. The materials are generally found to have a stable structure when cycled in a lithium-based battery, possibly due at least in part to the particular pore morphology and relatively pure composition resulting from essentially complete reduction of the initial silicon oxide. In some embodiments, the pores in the pSi based material can have an average diameter from about 5 nm to about 500 nm, in other embodiments from about 10 nm to about 400 nm, in further embodiments from about 15 nm to about 300 nm. Pore sizes are evaluated through visual observation of an appropriate electron micrograph and averages are number averages. A person of ordinary skill in the art will recognize that additional ranges of values within the explicit diameter ranges above are contemplated and are within the present disclosure. Pore sizes can also be estimated from BET surface area measurements. Because of the relatively large pore sizes, most of the pores have diameters that are bigger than or on the same scale as the thickness of the wall of the pores. Considering silicon is known to have volume expansion on the order of two to three times of the original volume or greater during the lithium intercalation process, the pore morphology can give the pSi based material described herein particular relatively stable adaptability to structural changes during the battery cycling process.

The high crystallinity, high surface areas, high void volume properties of the pSi based material is believed to provide the material with high capacity and adaptability to structural stress caused by volume expansion during the silicon-lithium alloying process. For example, the void volume present in the pSi material can provide at least some accommodation for volume expansion and thus reduce stress on the material during silicon-lithium alloying. The reduced stress on the material can in turn produce a corresponding decrease in irreversible structural changes in the material upon cycling such that the performance of the pSi based negative electrode degrades more slowly. Consequently, a battery formed with the pSi based negative electrode can have satisfactory performance over a larger number of battery cycles. The formation of composites of pSi based material with carbon based material or metal can additionally mechanically stabilize the negative electrode for improved cycling.

In general, the pSi based material described herein have a high degree of crystallinity attributable to crystalline silicon based on x-ray diffraction or XRD studies described below. Crystalline silicon can be desirable because of its larger electrical conductivity relative to amorphous silicon nanoparticles, and the results herein suggest relatively stable cycling can be achieved with a very high specific capacity. For materials of interest herein, porous silicon can be non-doped or doped. In some embodiments, doped porous silicon can be desirable because of its larger electrical conductivity relative to non-doped porous silicon.

The crystallinity of the materials in general is evaluated through XRD signals, which can involve a comparison of x-ray scattering of the crystalline component having relatively sharp peaks compared to the amorphous XRD signals in the sample, which have broad peaks or a rising background toward 0 scattering angle. The overall observable XRD signals in the sample may come from both crystalline components as well as the amorphous components. In the highly crystalline product silicon material, the peak x-ray scattering intensity of the amorphous material within the porous silicon after leaching a product metal oxide generally exhibits peaks from the crystalline components significantly greater scattering intensity than the amorphous components.

In particular, the product nanostructured elemental silicon exhibits sharp and relatively intense x-ray diffraction peaks corresponding to crystalline elemental silicon. Powder x-ray diffractograms can exhibit peaks attributable to by-product metal oxides prior to extraction of the metal oxides. A relatively weak intensity broad scattering peak indicative of an amorphous phase is observed in the x-ray diffractogram of the nanostructured elemental silicon. Specific references to XRD spectra relate to scattering with a Cu Kα source. The broad amorphous scattering component decreases monotonically in intensity from low scattering angles, e.g., 2θ or 10 degrees. The x-ray diffractograms lack a peak in the broad amorphous scattering from 2θ between 15 and 25 degrees that are characteristic of silicon oxide. Thus, the diffractograms suggest that the materials do not contain large amounts of unreacted $SiO_2$. The source of the amorphous background scattering is not known with certainty, but it could be due to amorphous domains of silicon.

More specifically, the x-ray diffractogram can have a crystalline Si scattering peak at a scattering angle 2θ from 28 to 30 degrees with a peak intensity that is at least about twice, in some embodiments at least about 3 times and in further embodiments at least about 4 times, the greatest value of scattering intensity corresponding to broad amorphous scattering from scattering angle 2θ between 15 and 25 degrees. A person of ordinary skill in the art will recognize that additional ranges of scattering intensity ratios within the explicit ranges above are contemplated and are within the present disclosure. Broad x-ray scattering intensity at low scattering angles from amorphous phases can be monotonically decreasing toward larger scattering angles from angles from 2θ of 10 to 25 degrees. This monotonic behavior of scattering intensity as a function of scattering suggests that the product does not contain significant amounts of unreacted $SiO_2$. Amorphous silicon oxide can exhibit a broad scattering peak from values of 2θ of 10 to 25 degrees.

The BET surface area of the pSi based material is a significant parameter that can be evaluated, for example, using commercially available instruments. The surface area provides a measure of the total accessible surface of the material, which can correspond to the particle surface area as well as the surface provided by the porous nature of the material. Smaller particle sizes results in an increase in the surface area of the powder. Also, a highly porous material generally has a larger surface area as the porosity increases or as the pore sizes decrease with a constant void volume. While the high surface area corresponding to the highly porous material is presumably useful to achieve the good performance described herein, it is surprisingly found that performance significantly degrades if the surface area is very large, which may be attributable to structural destabilization of the material with respect to the changes that take place during cycling of the battery. Porosity of the material can be expressed in terms of BET surface areas since the pores directly increase the effective and measured surface area of the material. The pSi based material disclosed herein in general has a surface area from about 5 $m^2/g$ to about 300 $m^2/g$, in some embodiments from about 7.5 $m^2/g$ to about 240 $m^2/g$, in further embodiments from about 9 m²/g to about 200 m²/g, and in additional embodiments from about 10 m²/g to about 150 m²/g. A person of ordinary skill in the art will recognize that additional ranges of values within the explicit BET surface area ranges above are contemplated and are within the present disclosure. For a given particle size, the surface area of a porous material can also relate to the pore sizes and void volumes.

Processing to Form Porous Silicon Based Material

Figure 2:
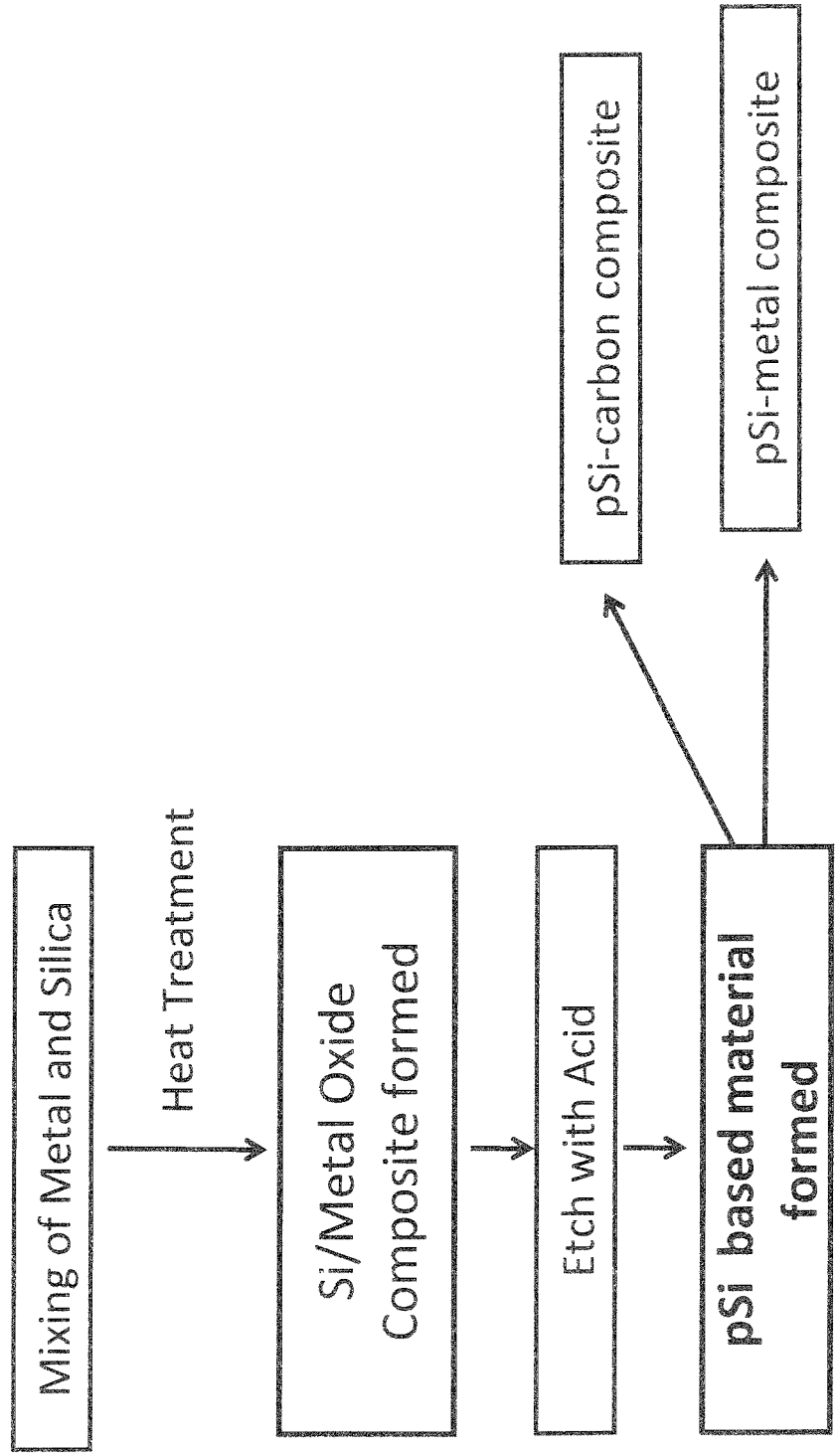
FIG. 2 is a flow chart showing a solid state synthesis process of the porous silicon material according to one embodiment.

The porous silicon based material described herein can be produced using a solid state metal reduction process illustrated in FIG. 2. Specifically, in an optional first step, silica and reducing metal powder can be intimately mixed together. The mixed sample can then be heat treated using a gradual temperature ramp. The heating ramp rate is controlled at a slow enough rate and low enough temperature such that the mixed sample does not significantly melt to form a melting mixture. During the heat treatment process, the metal is believed to reduce the silica into elemental silicon with concomitant oxidation of the metal to metal oxide. With an appropriate metal reducing agent, at least some of the metal oxide and most of the unreacted metal can be subsequently removed by chemical etching in acid to create pores in the structure to form the porous silicon based material. The silicon dioxide used can come from various sources including, for example, a range of commercial sources. Various reducing metals can be used to reduce silica, including Li, Na, K, Rb, Cs, Be, Mg, Ca, Sr, Ba, Al, Ni, Zr, or a combination thereof. Various acids can be used to perform the etching step, including hydrochloric acid, sulfuric acid, phosphoric acid, acetic acid, nitric acid, or a combination thereof, and the selection of the etching conditions can be selected based on the particular reducing metal. For embodiments based on magnesium reducing metal, a small amount of magnesium silicate may be present in some of the porous silicon based material.

The product porous silicon material can be combined with an electrically conductive material to improve the performance of an ultimate electrode formed from the material. In some embodiments, pyrolytic carbon is deposited on the porous silicon based material using a carbonization process to form a silicon-carbon composite material. In other embodiments, carbon nanofibers are incorporated into the porous silicon based material through mechanically milling the components together to form another silicon-carbon composite material. Conductive metal can also be deposited on the surface of the pSi material to form silicon-metal composite material.

The amount of reducing metal can be selected to achieve a desired material property. Specifically, a range of reducing metal can be used from a sub-stoichiometric amount to an excess stoichiometric amount. If a sub-stoichiometric amount is used, clearly some silicon remains in an oxidized form, which can be generally written as $SiO_x$, and it is not clear if partially reduced silicon oxide is formed, which can be an active material in a lithium-based battery. If an excess amount of reducing metal is used, this metal may or may not be removed by a subsequent etch step. With respect to magnesium reducing metal, magnesium oxidized to a +2 state, and silicon is reduced from a +4 oxidation state in silicon dioxide. Thus, a mole ratio of Si to Mg of 1:2 is a stoichiometric balanced amount of reducing metal. Generally, mole ratios of silicon to magnesium can be from about 1.25 to about 2.75, in further embodiments from about 1.4 to about 2.6 and in other embodiments from about 1.5 to about 2.4. Similarly, for any reducing metal relative to a stoichiometric amount to reduce $SiO_2$ to elemental Si, the amount of reducing metal can be from about 0.675 to about 1.375, in further embodiments from about 0.7 to about 1.3 and in other embodiments from about 0.75 to about 1.2 equivalents ratios. A person of ordinary skill in the art will recognize that additional ranges of amounts of reducing metal within the explicit ranges above are contemplated and are within the present disclosure.

High energy mechanical milling can be particularly effective to intimately mix the silica and the reducing metal. In some embodiments, the reducing metal is ball milled with the silicon dioxide for about 15 minutes to about 10 hours or more at 100 RPM to 1000 RPM to form the mixture. A person of ordinary skill in the art will recognize that any reasonable milling time and milling speed are contemplated, such as ranges of times and rates within the explicit ranges above are contemplated and are within the present disclosure.

Results obtained for these materials suggest that desired structure of the product nanostructures silicon is obtained with gradual ramping of the heating of the mixture, either continuously or step-wise, of the silica and reducing metal to reach a target temperature followed by heating at the target temperature for a period of time. For example, after a gradual temperature ramp to reach a target temperature, the mixture can be then heated at about 300° C. to about 950° C. over the course of about 1 hour to about 60 hours, to form a mixture of silicon and metal oxide. Additionally, a plurality of steps can be selected to pause the temperature ramp for a period of time. In particular, there can be one, two, three, four or more than four intermediate temperature steps between room temperature and the target temperature at which to pause the temperature ramp. The temperature steps can be selected as desired lower than the target temperature. The temperature generally can be held at the temperature step for a time from about 15 minutes to about 1.5 hours. For example, in the examples, heating was performed with three temperature steps, 200° C., 350° C. and 400° C., where the temperature was held at the step for about 1 hour, on the way to a target temperature of 700° C. With continuous or stepwise heating, the temperature ramp rate can generally be from about 0.5° C./min to about 20° C./min; in further embodiments from about 0.75° C./min to about 17.5° C./min, in additional embodiments about from about 1° C./min to about 15° C./min, and in still further embodiments about from 1.5° C./min to about 12° C./min. While this gradual temperature ramp is described as a linear temperature ramp, other gradual heating profiles can be used to obtain an appropriate gradual heating of the sample. A person of ordinary skill in the art will recognize that additional ranges of values within the explicit ramp rate above are contemplated and are within the present disclosure.

The temperature ramp is performed to reach a target temperature that is selected to achieve a desired property of the product porous silicon. The heating is then continued for an additional selected heating time at the target temperature. When the selected time limit is reached, the heating is discontinued, and the sample is allowed to cool. In additional or alternative embodiments, the cooling can also be performed in a controlled gradual process. In some embodiments, the heating at the target temperature is performed, not including ramp heating times and cooling times, over the course of about 15 min to about 60 hours; in other embodiments about 0.5 hours to about 40 hours, in further embodiments about 1 hour to about 20 hours, in additional embodiments about 2 hours to about 15 hours, and in still further embodiments about 3 hours to 10 hours. In some embodiments, the target heating temperature is from about 450° C. to about 950° C., in other embodiments up to about 500° C. to about 900° C., and in further embodiments up to about 525° C. to about 875° C., and in additional embodiments up to about 550° C. to 850° C.

A person of ordinary skill in the art will recognize that additional ranges of values within the explicit ranges of heating times and heating temperatures above are contemplated and are within the present disclosure.

The size of the pores as indicated by measurable BET surface area can be influenced by the rate of the heating ramp. In general, slower heating ramp rate produces smaller pores which give larger surface area. Heating rates and temperature may also affect the crystallinity or other subtle properties of the product pSi based material, which is reflected in the battery performance of the material. Slower heating rates generally result in smaller grain sizes of silicon while faster heating rates lead to larger silicon particles. Also, it is believed that faster heating rates may result in greater formation of inert metal silicates, which decrease the electrochemical performance.

After the heat treatment, the reaction mixture containing the silicon and metal oxide is subjected to etching to remove the metal oxide from the mixture to form the pSi based material. The etching process may be accompanied by heating as well as vigorous stirring to facilitate the removal of the metal oxide. In general, a variety of acids at various concentrations may be used so long as the acid does not react with silicon. Suitable acid may include, for example, hydrochloric acid, hydrofluoric acid, sulfuric acid, phosphoric acid, acetic acid, nitric acid, or a combination thereof. The specific etching agent can be selected to remove a product metal oxide and/or unreacted reducing metal while not reacting with the elemental silicon. In some embodiments, the acid concentration used to perform the etching step can be from about 0.1M to about 8M and in further embodiments from about 0.25M to about 5M. The etching can be performed for a suitable time to remove the desired materials. In some embodiments, the etching time is from about 30 minutes to about 5 days, in further embodiments from about 1 hour to about 3 days and in other embodiments form about 2 hours to about 2 days. A person of ordinary skill in the art will recognize that additional ranges of acid concentrations and etching times within the explicit ranges above are contemplated and are within the present disclosure.

Pyrolytic Carbon Coatings

Also, carbon coatings can be applied over the silicon-based materials to improve electrical conductivity and/or to provide structural support to the resulting materials. The carbon coatings seem to also stabilize the silicon based material with respect to improving cycling and decreasing irreversible capacity loss. The carbon coatings can be formed from pyrolyzed organic compositions under oxygen free atmospheres. Hard carbon coatings are generally formed at relatively high temperatures. The properties of the coatings can be controlled based on the processing conditions. In particular, carbon coatings can have a high hardness and generally can comprise significant amorphous regions possible along with graphitic domains and diamond structured domains.

Carbon coatings aimed from coal tar pitch is described in published PCT patent application WO 2005/011030 to Lee et al., entitled "A Negative Active Material for Lithium Secondary Battery and a Method for Preparing Same," incorporated herein by reference. In contrast, as described herein, an organic composition is dissolved in a suitable solvent and mixed with the pSi based material. The solvent is removed through drying to form a solid precursor coated pSi based material. This approach with a solvent for delivering a solid pyrolytic carbon precursor can facilitate formation of a more homogenous and uniform carbon coating. Then, the precursor coated material is heated in an effectively oxygen free environment to form the pyrolytic carbon coating. The heating is generally performed at a temperature of at least about 500° C., and in further embodiments at least about 700° C. and in other embodiments, from about 750° C. to about 1350° C. Generally, if temperatures are used above about 800° C., a hard carbon coating is formed. The heating can be continued for a sufficient period of time to complete the formation of the hard carbon coating. In some embodiments, desirable precursors can comprise non-polymer organic compositions that are solids or liquids at room temperature and have from two carbon atoms to 20 carbon atoms, and in further embodiments from 3 carbon atoms to 15 carbon atoms as well as other ranges of carbon atoms within these ranges, and generally these molecules can comprise other atoms, such as oxygen, nitrogen, sulfur, and other reasonable elements. Specifically, suitable non-polymer organic compounds include, for example, sugars, such as sucrose, other solid alcohols, such as furfuryl alcohol, solid carboxylic acids, such as citric acid, or combinations thereof. In additional or alternative embodiments, desirable carbon precursors comprise polymers, such as polyacrylonitrile, and the like. In some embodiments the compounds include for example, poly vinyl chloride, poly (vinyl chloride)-co-vinyl acetate, polyacrylonitrile, polymerized furfuryl alcohol, poly[(o-cresyl glycidyl ether)-co-formaldehyde resin, poly(methacrylo-nitrile), a combination thereof. The carbon coating generally comprises hard amorphous carbon, although some degree of graphite and/or diamond-like domains may be present. The coated materials generally comprise no more than about 50 weight percent pyrolytic carbon, in further embodiments no more than about 40 weight percent, and in additional embodiments, from about 1 weight percent to about 30 weight percent. A person of ordinary skill in the art will recognize that additional ranges within the explicit ranges above of amounts of coating composition are contemplated and are within the present disclosure.

Metal Coatings or Composites

As an alternative to carbon coatings, elemental metal can be coated onto the pSi based material. Suitable elemental metals include metals that can be reduced under reasonable conditions to form an inert metal in the battery. In particular, silver and copper can be reduced to deposit the metal coating. The elemental metal coating can be expected to increase electrical conductivity and to stabilize the pSi based material during the lithium alloying and de-alloying process. In general, the coated material can comprise no more than about 25 weight percent metal coating and in further embodiments from about 1 weight percent to about 20 weight percent metal coating. A person of ordinary skill in the art will recognize that additional ranges of metal coating composition within the explicit ranges above are contemplated and are within the present disclosure. A solution based approach can be used to apply the metal coating. For example, the silicon-based material to be coated can be mixed with a solution comprising dissolved salt of the metal, such as silver nitrate, silver chloride, copper nitrate, copper chloride or the like, and a reducing agent can be added to deposit the metal coating. Suitable reducing agents include, for example, sodium hypophosphite, sodium borohydride, hydrazine, formaldehyde and the like.

Nano-scale Carbon Fibers or Particles and pSi Composites

In some embodiments, the negative electrode active material comprises a composite of a carbon material and the porous crystalline elemental silicon material. The carbon material can be nanoscale and/or nanostructured to facilitate the combination, and the nanostructured components can then be combined to form a composite of the silicon component and the carbon component. For example, the components of the composite can be milled together to form the composite, in which the constituent materials are intimately associated, but generally not alloyed. The nanostructures characteristics are generally expected to manifest themselves in the composite, although characterization of the composites may be less established relative to the characterization of the component materials. In some embodiments, the negative electrode active material can comprise a silicon-based material formed into an intimate composite with carbon nanofibers and/or carbon nanoparticles.

Without being limited by a theory, it is believed that carbon coatings and/or carbon nanofibers-nanoparticles may provide structural stability to the expanding silicon-based materials during silicon-lithium alloying along with improving electrical conductivity. In particular, it is believed that the carbon coating and/or carbon nanofibers-particles can act as a buffer layer thereby reducing the stress on the silicon-based material during volume expansion. Desirable battery performance has been observed with composites of carbon and the porous silicon materials. In general, the composite can comprise at least about 50 weight percent porous elemental silicon, in further embodiments, from about 60 weight percent to about 95 weight percent and in additional embodiments from about 70 weight percent to about 90 weight percent porous nano-structured silicon. A person of ordinary skill in the art will recognize that additional ranges of silicon/silicon alloy composition within the explicit ranges above are contemplated and are within the present disclosure.

Carbon nanofibers and/or carbon nanoparticles provide for good electrical conductivity and can provide a support structure for nano-structured silicon such that the stress of alloy formation with lithium can be reduced. Carbon nanofibers can be obtained or can be synthesized using a vapor organic composition and a catalyst in a suitable thermal reaction. One approach for the synthesis of carbon nanofibers are described in published U.S. patent application 2009/0053608 to Choi et al., entitled "Anode Active Material Hybridizing Carbon Nanofiber for Lithium Secondary Battery," incorporated herein by reference. Carbon fibers are available commercially from a variety of suppliers. Suitable suppliers are summarized in the following Table, which is in two parts.

| Fiber | Company | Product ID | Length (μm) | Diameter (nm) |
|---|---|---|---|---|
| 1 | Showa Denko | VGCF-H | 10-20 | 150 |
| 2 | Nano-vision tech | GNF-100 | ~30 | ~200 |
| 3 | | GNF-L | ~30 | ~300 |
| 4 | Nanostructured & amorphous materials Inc. | GNF | 10-40 | 200-500 OD & 1-10 core |
| 5 | Zoltek | PANEX 30 | 150-200 | 7400 |
| 6 | | PANEX 32 | 100-200 | ~7200 |
| 7 | E&L enterprises | PC100 | 80-100 | 7000 |
| 8 | Kureha | KCF100 | 130-1000 | 15000 |
| 9 | | KGF200 | 100-1000 | 14500 |
| 10 | Cytek carbon Inc | Cytek | | 10 |
| 11 | Pyrograph products Inc. | PR19-XT-HHT | | 150 |
| 12 | | PR25-XT-HHT | | 100 |
| 13 | SGL group carbon | SIGRAFIL | | 8000 |

| Fiber | Powder resistivity (W-cm) | Specific surface area (m$^2$/g) | Bulk density (g/cm$^3$) | True density (g/cm$^3$) | Purity |
|---|---|---|---|---|---|
| 1 | 0.01-0.015 at 0.8 g/cm$^3$ | 13 | 0.04 | 2 | 0.1% ash |
| 2 | | 100-300 | 0.15-0.18 | | >90% |
| 3 | | 100 | 0.12-0.15 | | >90% |
| 4 | ~0.06 at 0.8 g/cm$^3$ | <25 | 0.15-0.25 | 1.9 | ~99.8% & 0.2% Fe |
| 5 | 0.0014 | | 0.44 | 1.75 | 99% |
| 6 | 0.0015 | | 0.44 | 1.81 | >95% |
| 7 | | | 0.3 | | >92% |
| 8 | 0.15 | | | 1.63 | >95% |
| 9 | 0.5 | | | 1.6 | >99% |
| 10 | 0.012 | | | 1.9 | |
| 11 | | 15-25 | | | Fe <100 ppm |
| 12 | | ~40 | | | Fe <100 ppm |
| 13 | | | | 1.75 | >95% |

In general, suitable carbon nanofibers can have average diameters of about 25 nm to about 250 nm and in further embodiments, from about 30 nm to about 200 nm, and with average lengths from about 2 microns to about 25 microns, and in further embodiments from about 4 microns to about 20 microns. A person of ordinary skill in the art will recognize that additional ranges of nanofiber average diameters and lengths within the explicit ranges above are contemplated and are within the present disclosure.

The results in the Examples demonstrate that the formation of a Si-carbon composite can lead to good cycling properties even at very high loadings. With other silicon based materials, it is difficult or impossible to obtain any reasonable cycling performance with Si-based anodes at loading levels greater than 1 mg/cm$^2$. Using the improved silicon materials herein, the loading levels achieved from the Si-based anodes are greater than 3.5 mg/cm$^2$ while still showing good cycling performance. In addition, the composites still exhibit high cycling specific capacity. The formation of the composites with carbon following formation of the porous highly crystalline silicon exhibits significantly improved capacity performance relative to materials that were formed into composites prior to reducing the silicon oxide to silicon.

Similarly, pyrolytic carbon particles, e.g., carbon blacks, can be used as a support in appropriate composites. Carbon black can have average particle sizes of no more than about 250 nm, and in some embodiments no more than about 100 nm, as well as suitable subranges within these ranges. Carbon blacks are readily available from a variety of suppliers, such as Cabot Corporation and Timcal, Ltd, Switzerland (acetylene black, Super P™).

Processing to Form Composites of Carbon and pSi Based Material

To form the composites, the constituent materials are obtained and/or prepared and combined to introduce strong mechanical interactions between the material components. In general, the types of interactions between the constituents of the composites do not need to be well characterized. The composites though are found to exhibit desirable battery performance in a lithium ion battery.

In some embodiments, nanostructured silicon-carbon composites can be formed by milling nanostructured silicon with carbon fibers and/or carbon nanoparticles. The milling process can comprise, for example, jar milling and/or ball milling, such as planetary ball milling. Ball milling and similarly jar milling involves grinding using a grinding medium, which can then be substantially removed from the ground material. A planetary ball mill is a type of ball milling in which the mill comprises a sun-wheel, at least one grinding jar mounted eccentrically on the sun-wheel, and a plurality of mixing balls within the grinding jar. In operation, the grinding jar rotates about its own axis and in the opposite direction around the common axis of the sun-wheel.

Desirable ball milling rotation rates and ball milling times can be selected based on the desired nanostructured silicon composite composition and structure. For the formation of silicon/silicon alloy composites described herein, ball milling rotation rates can be from about 25 rpm to about 1000 rpm and in further embodiments from about 50 rpm to about 800 rpm. Furthermore, desirable ball milling times can be from about 10 minutes to about 20 hour and in further embodiments from about 20 minutes to about 10 hours. A person of ordinary skill in the art will recognize that additional ranges of milling rates and times within the explicit ranges above are contemplated and are within the present disclosure. The mill container can be filled with an inert gas to avoid oxidizing the contents of the container during milling. Examples of suitable grinding media include, for example, particles of zirconia, alumina, tungsten carbide or the like.

High Capacity Positive Electrode Active Materials

In general, positive electrode (cathode) active materials comprise a lithium intercalation material such as lithium metal oxides or lithium metal phosphates. Positive electrode active materials include, for example, as stoichiometric layered cathode materials with hexagonal lattice settings like $LiCoO_2$, $LiNiO_2$, $LiCo_{1/3}Mn_{1/3}Ni_{1/3}O_2$ or the like; cubic spinel cathode materials such as $LiMn_2O_4$, $Li_4Mn_5O_{12}$, or the like; olivine materials, such as $LiMPO_4$ (M=Fe, Co, Mn, combinations thereof and the like). Lithium rich positive electrode active materials are of interest due to their high capacity, such as layered cathode materials, e.g., $Li_{1+x}(NiCoMn)_{0.33-x}O_2$ ($0 \leq x < 0.3$) systems; layered-layered composites, e.g., $xLi_2MnO_3 \cdot (1-x)LiMO_2$ where M can be Ni, Co, Mn, combinations thereof and the like; and composite structures like layered-spinel structures such as $LiMn_2O_4 \cdot LiMO_2$. In some embodiments, a lithium rich composition can be referenced relative to a composition $LiMO_2$, where M is one or more metals with an average oxidation state of +3.

In some embodiments, the lithium rich compositions can be represented approximately with a formula $Li_{1+x}M_{1-y}O_2$, where M represents one or more non-lithium metals and y is related to x based on the average valance of the metals. In layered-layered composite compositions, x is approximately equal to y. The additional lithium in the initial cathode material can provide to some degree corresponding additional active lithium for cycling that can increase the battery capacity for a given weight of cathode active material. In some embodiments, the additional lithium is accessed at higher voltages such that the initial charge takes place at a higher voltage to access the additional capacity.

Lithium rich positive electrode active materials of particular interest are represented approximately by a formula

   Formula I where b ranges from about 0.05 to about 0.3, α ranges from about 0 to about 0.4, β ranges from about 0.2 to about 0.65, γ ranges from 0 to about 0.46, δ ranges from 0 to about 0.15 and z ranges from 0 to about 0.2 with the proviso that both α and γ are not zero, and where A is a metal element different from Ni, Mn, Co, or a combination thereof. Element A and F (fluorine) are optional cation and anion dopants, respectively. Element A can be, for example Mg, Sr, Ba, Cd, Zn, Al, Ga, B, Zr, Ti, Ca, Ce, Y, Nb, Cr, Fe, V, Li or combinations thereof. A person of ordinary skill in the art will recognize that additional ranges of parameter values within the explicit compositional ranges above are contemplated and are within the present disclosure.

To simplify the following discussion in this section, the optional dopants are not discussed further except for under the context of the following referenced applications. The use of a fluorine dopant in lithium rich metal oxides to achieve improved performance is describe in published U.S. patent application 2010/0086854 to Kumar et al., entitled "Fluorine Doped Lithium Rich Metal Oxide Positive Electrode Battery Materials With High Specific Capacity and Corresponding Batteries," incorporated herein by reference. Compositions in which A is lithium as a dopant for substitution for Mn are described in published U.S. patent application 2011/0052989 to Venkatachalam et al., entitled "Lithium Doped Cathode Material," incorporated herein by reference. The specific performance properties obtained with +2 metal cation dopants, such as $Mg^{+2}$, are described in copending U.S. patent application Ser. No. 12/753,312 to Kathikeyan et al., entitled "Doped Positive Electrode Active Materials and Lithium Ion Secondary Batteries Constructed Therefrom," incorporated herein by reference.

The formulas presented herein for the positive electrode active materials are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

The stoichiometric selection for the compositions can be based on some presumed relationships of the oxidation states of the metal ions in the composition. As an initial matter, if in Formula I above, b+α+β+γ+δ is approximately equal to 1, then the composition can be correspondingly approximately represented by a two component notation as:

   Formula II where 0<x<1, M is one or more metal cations with an average valance of +3 with at least one cation being a Mn ion or a Ni ion and where M' is one or more metal cations with an average valance of +4. It is believed that the layered-layered composite crystal structure has a structure with the excess lithium supporting the formation of an alternative crystalline phase. For example, in some embodiments of lithium rich materials, a $Li_2MnO_3$ material may be structurally integrated with either a layered $LiMO_2$ component where M represents selected non-lithium metal elements or combinations thereof. These compositions are described generally, for example, in U.S. Pat. No. 6,680,143 to Thackeray et al., entitled "Lithium Metal Oxide Electrodes for Lithium Cells and Batteries," which is incorporated herein by reference.

Recently, it has been found that the performance properties of the positive electrode active materials can be engineered around the specific design of the composition stoichiometry.

The positive electrode active materials of particular interest can be represented approximately in two component notation as:

$$x\,Li_2MnO_3 \cdot (1-x)LiMO_2 \qquad \text{Formula III}$$

where M is one or more metal elements with an average valance of +3 and with one of the metal elements being Mn and with another metal element being Ni and/or Co. In general, in Formula II and III above, the x is in the range of $0<x<1$, but in some embodiments $0.03 \leq x \leq 0.6$, in further embodiments $0.075 \leq x \leq 0.50$, in additional embodiments $0.1 \leq x \leq 0.45$, and in other embodiments $0.15 \leq x \leq 0.425$. A person of ordinary skill in the art will recognize that additional ranges within the explicit ranges of parameter x above are contemplated and are within the present disclosure.

In some embodiments, M in Formula III comprises manganese, nickel, cobalt or a combination thereof along with an optional dopant metal and can be written as $Ni_u Mn_v Co_w A_y$, where A is a metal other than Ni, Mn or Co. Consequently Formula III now becomes:

$$x.Li_2MnO_3 \cdot (1-x)LiNi_u Mn_v Co_w A_y O_2 \qquad \text{Formula IV}$$

where $u+v+w+y \approx 1$. While Mn, Co and Ni have multiple accessible oxidation states, which directly relates to their use in the active material, in these composite materials if appropriate amounts of these elements are present, it is thought that the elements can have the oxidation states $Mn^{+4}$, $Co^{+3}$ and $Ni^{+2}$. In the overall formula, the total amount of manganese has contributions from both constituents listed in the two component notation. Additionally, if $\delta=0$ in Formula I, the two component notation of Formula IV can simplify with $v \approx u$ to $x.Li_2MnO_3 \cdot (1-x)LiNi_u Mn_u Co_w O_2$, with $2u+w=1$.

In some embodiments, the stoichiometric selection of the metal elements can be based on the above presumed oxidation states. Based on the oxidation state of dopant element A, corresponding modifications of the formula can be made. Also, compositions can be considered in which the composition varies around the stoichiometry with $v \approx u$. The engineering of the composition to obtain desired battery performance properties is described further in published U.S. patent application 2011/0052981 (the '981 application) to Lopez et al., entitled "Layer-Layer Lithium Rich Complex Metal Oxides With High Specific Capacity and Excellent Cycling," incorporated herein by reference. Similar compositions have been described in published U.S. patent application 2010/0086853A (the '853 application) to Venkatachalam et al. entitled "Positive Electrode Material for Lithium Ion Batteries Having a High Specific Discharge Capacity and Processes for the Synthesis of these Materials", and published U.S. patent application 2010/0151332A (the '332 application) to Lopez et al. entitled "Positive Electrode Materials for High Discharge Capacity Lithium Ion Batteries", both incorporated herein by reference.

The positive electrode material can be advantageously synthesized by co-precipitation and sol-gel processes detailed in the '853 application and the '332 application. In some embodiments, the positive electrode material is synthesized by precipitating a mixed metal hydroxide or carbonate composition from a solution comprising +2 cations wherein the hydroxide or carbonate composition has a selected composition. The metal hydroxide or carbonate precipitates are then subjected to one or more heat treatments to form a crystalline layered lithium metal oxide composition. A carbonate co-precipitation process described in the '332 application gave desired lithium rich metal oxide materials having cobalt in the composition and exhibiting the high specific capacity performance with superior tap density. These copending patent applications also describe the effective use of metal fluoride coatings to improve performance and cycling.

It is found that for many positive electrode active materials a coating on the material can improve the performance of the resulting batteries. Suitable coating materials, which are generally believed to be electrochemically inert during battery cycling, can comprise metal fluorides, metal oxides, metal non-fluoride halides or metal phosphates. The results in the Examples below are obtained with materials coated with metal fluorides.

For example, the general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference. Improved metal fluoride coatings with appropriately engineered thicknesses are described in published U.S. patent application 2011/0111298 to Lopez et al, (the '298 application) entitled "Coated Positive Electrode Materials for Lithium Ion Batteries," incorporated herein by reference. Suitable metal oxide coatings are described further, for example, in published U.S. patent application 2011/0076556 to Kathikeyan et al. entitled "Metal Oxide Coated Positive Electrode Materials for Lithium-Based Batteries", incorporated herein by reference. The discovery of non-fluoride metal halides as desirable coatings for cathode active materials is described in copending U.S. patent application Ser. No. 12/888,131 to Venkatachalam et al., entitled "Metal Halide Coatings on Lithium Ion Battery Positive Electrode Materials and Corresponding Batteries," incorporated herein by reference. The synthesis approaches along with the coating provide for superior performance of the materials with respect to capacity as well as cycling properties. The desirable properties of the active material along with the use of desirable anode material described herein provide for improved battery performance.

Performance

In general, various appropriate testing procedures can be used to evaluate the performance of the battery. The pSi based electrodes can be tested against a lithium foil electrode to evaluate the capacity and the IRCL. However, other testing can be performed with a realistic positive electrode since then the battery is cycled over appropriate voltage ranges for cycling in a more suitable commercial battery format. Suitable testing procedures are described in more detail in the examples below. Specifically, batteries assembled with a lithium foil electrode are cycled with the pSi based electrode functioning as a positive electrode (cathode) and the lithium foil functions as the negative electrode (anode). The batteries with a lithium foil electrode can be cycled over a voltage range, for example, from 0.005V to 1.5 V at room temperature. Alternatively, batteries can be formed with a positive electrode comprising a layered-layered lithium rich metal oxide in which the pSi based electrode is then the negative electrode, and the battery can then be cycled between 4.5 volts and 1.5 volt at room temperature. In some embodiments, high capacity manganese rich (HCMR™) material is used as the electro active components of the positive electrode. For the batteries with a lithium metal oxide-based positive electrode, unless specified otherwise the first cycle can be charged and discharged at a rate of C/20 and subsequent cycling can be at a rate of C/3, with charging at C/3. The specific discharge capacity is significantly dependent on the discharge rate. The notation C/x implies that the battery is discharged at a rate to fully discharge the battery to the selected voltage minimum in x hours. Batteries formed with porous silicon material described herein have demonstrated superior performance at reasonable cycling rates. Herein, performance values are at room temperature unless explicitly indicated otherwise.

In general, the porous silicon material described herein when tested against lithium foil counter electrode with a discharge from 1.5V to 0.005V can have a specific discharge capacity of at least 1800 mAh/g, in further embodiments at least about 2000 mAh/g, in additional embodiments at least about 2300 mAh/g, and in further embodiments at least 2500 mAh/g at a rate of C/20. With respect to cycling performance, the porous silicon material can exhibit a 7th cycle discharge capacity of at least 1800 mAh/g, in further embodiments at least about 2000 mAh/g, and in other embodiments at least about 2200 mAh/g at a discharge rate of C/3. A discharge specific capacity against a lithium counter electrode would roughly correspond with a charge capacity when placed against a lithium metal oxide counter electrode. A person of ordinary skill in the art will recognize that additional ranges of values within the explicit specific capacity ranges above are contemplated and are within the present disclosure. The first charge-discharge cycle of a cell with a lithium foil counter electrode can be used to evaluate the irreversible capacity loss (IRCL) of the negative electrode. The IRCL of batteries with lithium counter electrode in general is no more than about 40%, in some embodiments no more than about 35%, in further embodiments no more than about 25%, and in additional embodiments from about 25% to about 15%. A person of ordinary skill in the art will recognize that additional ranges of values within the explicit percentage ranges above are contemplated and are within the present disclosure.

Battery performance generally depends on the loading level in the electrode. In general, electrodes using the porous silicon material described herein can have a loading level of no more than about 4 mg/cm$^2$, in further embodiments from about 1 mg/cm$^2$ to about 3.75 mg/cm$^2$, and in additional embodiments from about 1.4 mg/cm$^2$ to about 3.5 mg/cm$^2$. A person of ordinary skill in the art will recognize that additional ranges of values within the explicit density ranges above are contemplated and are within the present disclosure. Loading levels are appropriate for batteries with either a lithium foil counter electrode or a cathode/positive electrode with a lithium metal oxide active material.

For batteries formed with a lithium metal oxide active material in the cathode and the porous silicon active material in the anode, the batteries can be cycled with a capacity at 50 cycles that is at least about 75% of the 6th cycle specific capacity, in some embodiments at least about 80%, in other embodiments at least about 90%, and in further embodiments at least about 95% of the 6th cycle specific capacity when cycled at a rate of C/3 at room temperature. The specific capacity can be calculated alternatively by dividing by the weight of the negative electrode active material or the weight of the positive electrode active material to alternatively get specific capacities for the negative electrode or the positive electrode. As demonstrated herein, the room temperature specific capacity at the 50th cycle at a rate of C/3 of the positive electrode can be at least about 150 mAh/g with a negative electrode specific capacity of at least about 1000 mAh/g. A person of ordinary skill in the art will recognize that additional ranges of values within the explicit cycle number ranges above are contemplated and are within the present disclosure.

EXAMPLES

Porous silicon based negative electrode materials were tested in batteries to evaluate their performance. These samples comprised porous silicon with or without formation into a silicon-carbon based composite material. Generally, the samples were formed into coin cells to test the performance of the materials with respect to lithium alloying/intercalation. A first set of coin cell batteries were formed with lithium foil as the counter electrode such that the porous silicon based electrode functioned as a positive electrode against the lithium foil. A second set of coin cell batteries were formed with a positive electrode comprising a lithium rich mixed metal oxide such that the resulting battery had a realistic formulation for cycling over a relevant voltage range for a commercial battery. The general procedure for formation of the coin cell batteries is described in the following discussion and the individual examples below describe formulation of the porous silicon based materials and the performance results from batteries formed from the porous silicon based materials. The batteries described herein with lithium foil counter electrode in general were cycled by charging and discharging between 0.005V-1.5V at a rate of C/20, C/10, C/5, and C/3 for the 1st and 2nd cycles, for the 3rd and 4th cycles, for the 5th and 6th cycles, and for subsequent cycles, respectively. The batteries described herein with high capacity manganese rich (HCMR™) positive electrode in general were cycled by charging and discharging between 4.6V and 1.5V in the first formation cycle and between 4.5V and 1.5V in the cycle testing for batteries at a rate of C/20, C/10, C/5, and C/3 for the 1st cycle, for the 2nd and 3$^{rd}$ cycles, for the 4th and 5th cycles, and for subsequent cycles, respectively.

To test particular samples, electrodes were formed from the samples of the porous silicon based active materials. In general, a powder of the porous silicon based active material was mixed thoroughly with acetylene black (Super P® from Timcal, Ltd., Switzerland) to form a homogeneous powder mixture. Separately, polyimide binder was mixed with N-methylpyrrolidone ("NMP") (Sigma-Aldrich) and stirred overnight to form a polyimide-NMP solution. The homogenous powder mixture was then added to the polyimide-NMP solution and mixed for about 2 hours to form a homogeneous slurry. The slurry was applied onto a copper foil current collector to form a thin, wet film and the laminated current collector was dried in a vacuum oven to remove NMP and to cure the polymer. The laminated current collector was then pressed between rollers of a sheet mill to obtain a desired lamination thickness. The dried laminate contained at least 75 wt % porous silicon based active material, at least 2 wt % acetylene black and at least 2 wt % polyimide binder. The resulting electrodes were assembled with either a lithium foil counter electrode or with a counter electrode comprising a lithium metal oxide (LMO).

For a first set of batteries with the lithium foil counter electrodes, the porous silicon based electrodes were placed inside an argon filled glove box for the fabrication of the coin cell batteries. Lithium foil (FMC Lithium) having thickness of roughly 125 micron was used as a negative electrode. A conventional electrolyte comprising carbonate solvents, such as ethylene carbonate, diethyl carbonate and/or dimethyl carbonate, was used. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

For a second set of batteries, the porous silicon based electrodes were used as negative electrode, and the positive electrodes comprised a high capacity lithium rich composition as described in the '853 application, the '332 application, and the '981 application referenced above. In particular, the LMO powder was synthesized that is approximately described by the formula $xLi_2MnO_3 \cdot (1-x)Li\,Ni_uMn_vCo_wO_2$ where $x=0.3$ or $0.5$. The resulting positive electrodes are referred to as high capacity manganese rich ("HCMR™") electrodes.

Electrodes were formed from the synthesized HCMR™ powder by initially mixing it thoroughly with conducting carbon black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin, wet film and the laminated current collector was dried in vacuum oven at 110° C. for about two hours to remove NMP. The laminated current collector was then pressed between rollers of a sheet mill to obtain a desired lamination thickness. The dried electrode comprised at least about 75 weight percent active metal oxide, at least about 1 wt % carbon black, at least about 1 weight percent graphite, and at least about 2 weight percent polymer binder.

Batteries fabricated from a silicon based negative electrode and a HCMR™ positive electrode were balanced to have excess negative electrode material. Some of the batteries fabricated from a porous silicon based negative electrode and a HCMR™ positive electrode can further comprise supplemental lithium. In particular, a desired amount of SLMP® powder (FMC Corp., stabilized lithium metal powder) was loaded into a vial and the vial was then capped with a mesh comprising nylon or stainless steel with a mesh size between about 40 μm to about 80 μm. SLMP® (FMC corp.) was then deposited by shaking and/or tapping the loaded vial over a pre-formed porous silicon based negative electrode. The coated porous silicon based negative electrode was then compressed to ensure mechanical stability. The amount of supplemental lithium was selected to approximately compensate for the irreversible capacity loss of the negative electrode.

Although conventional electrolytes were used to construct some of the batteries described herein, alternative electrolytes can also be used with better stability at higher voltage. The batteries with HCMR™ positive electrode used high voltage electrolytes as described in U.S. Patent Application No. 2011/0136019 to Amiruddin et al. entitled: "Lithium ion battery with high voltage electrolytes and additives", incorporated herein by reference. Based on these electrodes and the chosen electrolyte, the coin cell batteries were completed with separator and hardware as described above for the batteries with the lithium foil electrode. During the first cycle, the batteries were charged to 4.6V, and in subsequent cycles, the batteries were charged to 4.5V.

Example 1

Formation of Porous Silicon Based Material Using Magnesium Reduction

This example demonstrates the effective synthesis of the porous silicon using magnesium metal to reduce silicon dioxide and the characterization of the product material.

Figure 3:
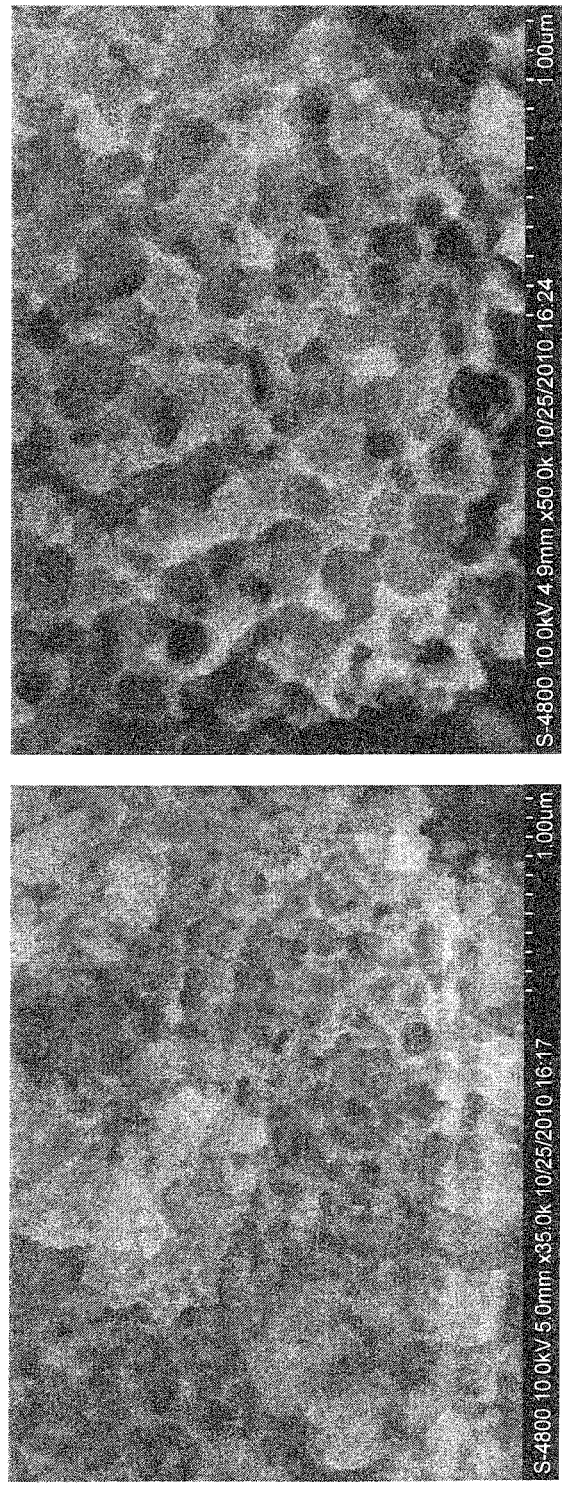
FIG. 3 shows the SEM micrographs of chemically produced porous silicon material at different magnifications.

In particular, a solid state metal reduction process using a reducing agent such as Mg metal to reduce silica ($SiO_2$) to silicon followed by acid leaching to remove the metal was used to produce porous silicon based material. The process is described in FIG. 2. Specifically, in the first step, commercially available silica and magnesium powder were intimately mixed using a high energy ball mill at for about 15 min to 10 h. The mixed sample was then taken in an alumina crucible and heat treated in a tube furnace under Ar atmosphere. During the heat treatment process, magnesium reduced silica into silicon and magnesium was oxidized to form magnesium oxide (MgO). The MgO and any unreacted Mg metal were subsequently removed by chemical etching in hydrochloric acid creating pores in the structure to form porous silicon. Small amounts of magnesium silicate ($Mg_2SiO_4$) were also formed in this process, which were not completely dissolved by the acid treatment. However, since magnesium silicate is electrochemically inert, the presence of small quantities is not significant with respect to performance of the product material. The resulting silicon produced in this process is a highly porous structure, as shown in the SEM images of the material in FIG. 3.

Various concentrations of magnesium, different heating rates and heating temperatures have been used to control the morphology of the porous silicon so as to obtain porous silicon anode material with desired properties. In general, the ratio of silicon dioxide versus magnesium is between 1:1 to 1:2.5. The different experimental conditions used and the resulting surface area of the porous silicon formed are tabulated in Table 1. The notation 650° C., 5° C./min, 6 hr run means the sample was heated at a rate of 5° C./min until 650° C., and then held at 650° C. for 6 hr. The notation MHS refers to multiple heating steps where the heating temperature was raised in a series of steps. In particular, the temperature was increased stepwise at a rate of 5° C./min first to 200° C. and held for 1 hr, then ramped to 350° C. and held for 1 h, to 400° C. and held for 1 h, and to 700° C. for 6 h. As shown in Table 1, the surface area of the porous silicon formed appeared to be similar for most of the conditions used ranging from 22-45 $m^2/g$. Exceptionally high surface area of 151 $m^2/g$ was obtained for porous silicon material that is produced at a very low heating rate of 2° C./min; although as described below this material did not exhibit good cycling. The high surface area obtained could be attributed to the pore morphology of silicon formed during the slow heating process. The first cycle discharge capacities are also tabulated in Table 1.

TABLE 1

Summary of chemically synthesized Porous silicon based anode material

| Sample | Processing Conditions | Mg Concentration | Li Deintercalation Capacity (mAh/g) | IRCL (%) | Electrode Loading (mg/cm$^2$) | Surface Area (m$^2$/g) |
|---|---|---|---|---|---|---|
| 1 | 650° C., 5° C./min, 6 hr run | High | 2159 | 38 | 1.7 | 45 |
| 2 | 650° C., 5° C./min, 6 hr run | Medium | 2408 | 22 | 1.7 | 22 |
| 3 | 650° C., 5° C./min, 6 hr run | Low | 2678 | 27 | 2.0 | 27 |
| 4 | 650° C., 5° C./min, 6 hr run | Lowest | 2279 | 32 | 3.3 | 24 |
| 5 | 650° C., 2° C./min, 6 hr run | High | 531 | 47 | 1.4 | 151 |
| 6 | *MHS, 5° C./min | High | 2682 | 29 | 2.3 | 28 |
| 7 | *MHS, 5° C./min | Medium | 3187 | 25 | 1.3 | 24 |

*MHS corresponds to a stepwise temperature ramp up to 700° C.

The XRD patterns of the Si/MgO composite is compared with the porous silicon material formed after acid etching and shown in FIG. 4. In the XRD of the Si/MgO composite, along with the silicon peaks, MgO peaks are also prominently visible. It is evident that after the acid treatment, MgO is removed and only silicon peaks remained along with trace amounts of magnesium silicates, although some of the magnesium silicate seemed to be removed.

The XRD patterns of the porous silicon samples of Table 1 formed at different conditions are shown in FIG. 5. The porous silicon samples appeared to have similar XRD patterns for silicon along with trace amounts of magnesium silicates. Sample 5 that produced under the reduced heating rate appear to have the least amount of observable magnesium silicate peaks.

Example 2

Figure 6A:
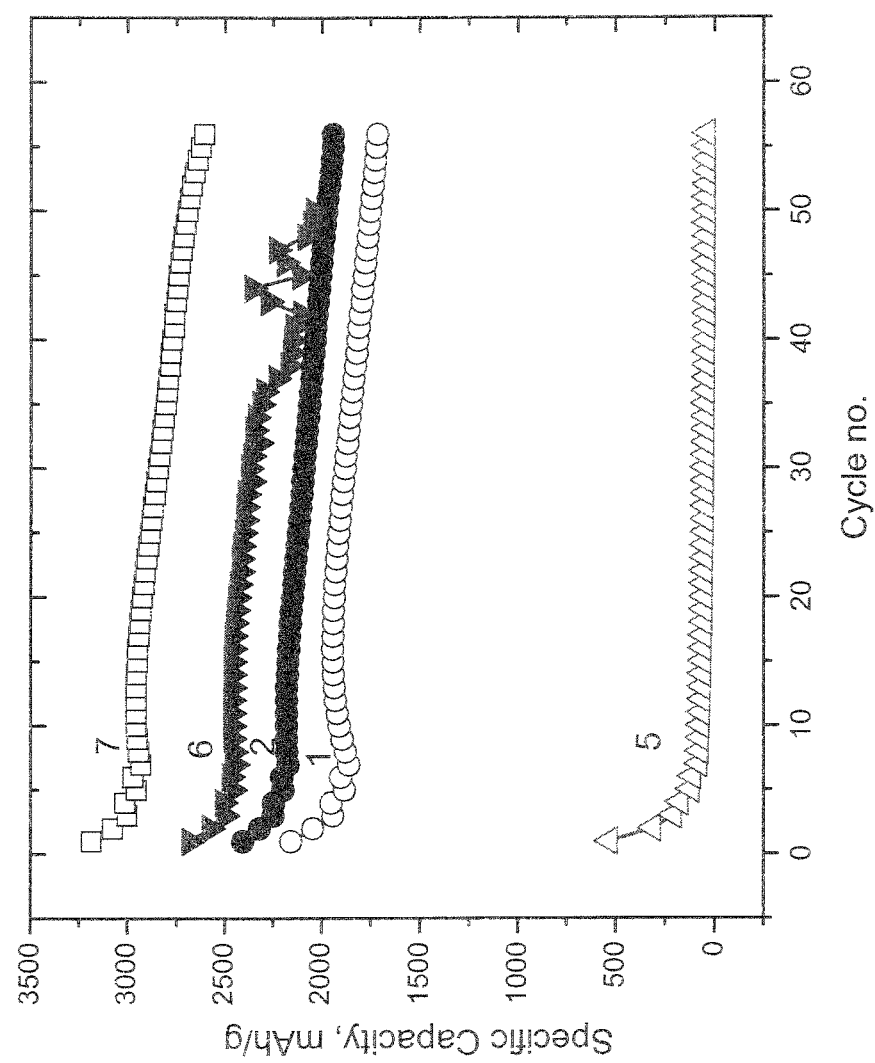
FIG. 6a shows the specific capacity versus cycle numbers of the batteries formed from the porous silicon based material of Table 1.

Cycling Performance of Batteries Formed from the Porous Silicon Material with a Lithium Metal Counter Electrode This example demonstrates superior performance of the porous silicon materials in batteries with a lithium foil counter electrode. The porous silicon materials formed under the conditions summarized in Table 1 and as described in Example 1 above was used to construct correspondingly numbered batteries with a lithium metal counter electrode. The general formation of the batteries is described in detail above. The first cycle lithium deintercalation capacities of the batteries are listed in table 1 and the electrochemical performances of the batteries are shown in FIG. 6a. With the exception of sample 5, the porous silicon produced at 2° C./min ramp rate, all the batteries cycled well showing high capacity and good cycle life up to 55 cycles. Of the samples examined, battery 7 formed with sample 7 porous silicon exhibited the best cycling performance, and battery 6 formed with sample 6 porous silicon exhibited the second best cycling performance. Electrode loading levels for the cells are shown in Table 1 and range from 1.4 to 3.3 mg/cm$^2$. These results are consistent with the higher first cycle lithium discharge capacity observed for these two batteries outlined in Table 1. The porous silicon based batteries were able to achieve capacities of >2000 mAh/g at a C/3 rate routinely, which is very high in comparison to typical graphitic carbon material having capacity of ~350 mAh/g. Electrodes constructed from the porous silicon materials greatly enhanced stability compared to electrodes constructed from nanoparticulate silicon. The pores in the porous silicon material are believed to accommodate the volume changes associated with silicon during cycling without damaging the electrode.

To demonstrate the improved cycling performance with pSi based material, a battery was formed from a silicon-based active composition comprising nano-particle silicon having an average primary particle size of 50-100 nm from Nanostructured and Amorphous Materials, Inc. with a lithium foil counter electrode as described above, and cycled between 1.5V and 0.005 V at a rate of C/20 for the first two cycles, C/10 for cycles 3 and 4, C/5 for cycles 5 and 6, and the remaining cycles at C/3. FIG. 6b is a graph containing plots of specific discharge capacity versus cycle number from the battery. After 6 cycles, at the beginning of the C/3 cycles, the specific capacity of the battery decreased down to about 1300 mAh/g specific capacity, showing significantly less specific capacity compared to the porous silicon samples 1, 2, 6, and 7 above.

Example 3

Cycling Performance of Batteries Formed from Carbon Composites of Porous Silicon with a Lithium Metal Counter Electrode This example demonstrated that the performance of composite material formed from the porous silicon and carbon can reduce the irreversible capacity loss and stabilize the cycling.

The first cycle capacity losses (IRCL) of porous silicon samples from example 1 are summarized in Table 1. To examine the effects of forming composites with carbon, silicon carbon composites were formed using the porous silicon from sample 6 (pSi). A first set of composite samples were prepared with pyrolytic carbon coated on the surface of the porous silicon of sample to form a hard carbon and porous silicon composite (pSi-C) by a hydrothermal approach using glucose as the carbon source. Specifically, glucose was dissolved in water and mixed with the pSi material. The solution was then ultrasonically mixed. The obtained solution was transferred to a Teflon® vessel and hydrothermally treated. After cooling down to room temperature, the solution was washed with DI water and filtered to obtain the solid precursors. The solid precursor was further dried in a vacuum oven. The dried solid precursor was then taken in a ceramic crucible and fired in a tube furnace to form a hard amorphous carbon coating on the porous silicon material. An additional set of composite samples were prepared using carbon nanofibers (CNF) to form porous silicon-carbon composites (pSi-CNF). Specifically, carbon nanofibers (CNFs) were mixed with pSi based material using a jar mill for about one hour to form the pSi-CNF material. No sieving step is performed after the jar mill mixing process.

Figure 7:
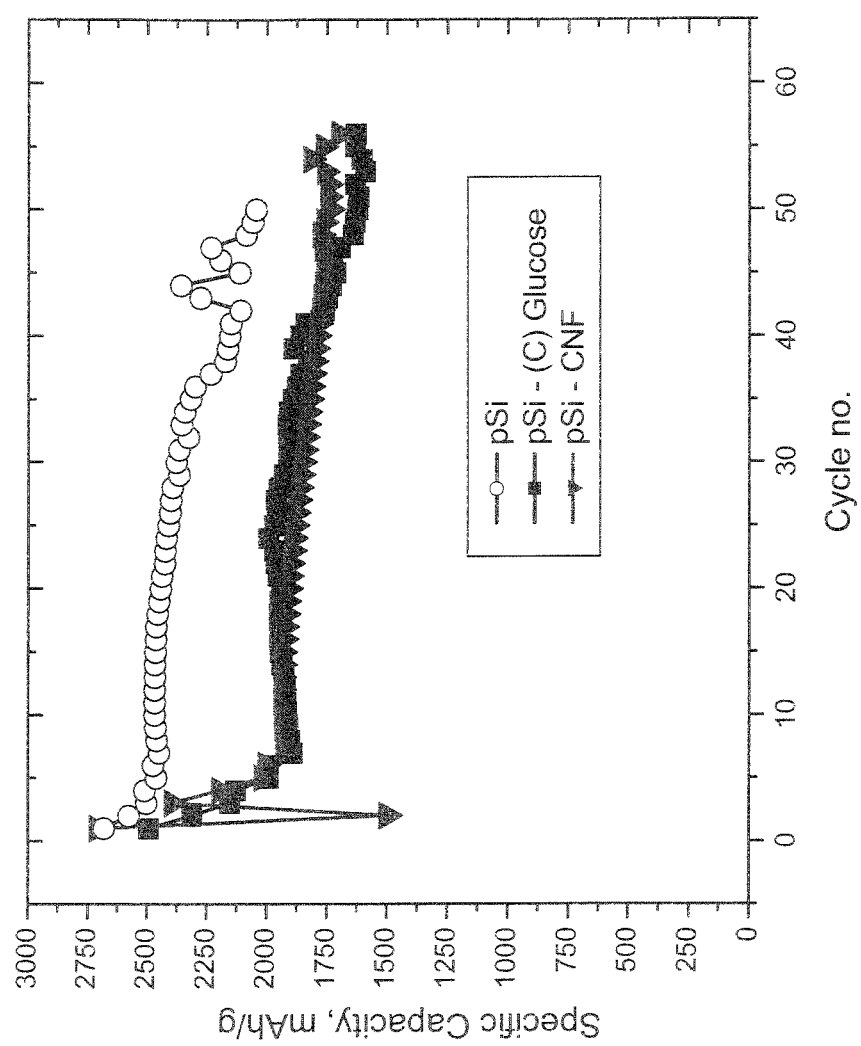
FIG. 7 shows specific capacity versus cycle number of the batteries formed from porous silicon and porous silicon-carbon composites.

These composites were used to form electrodes to be assembled with a lithium counter electrode to form a coin cell battery using the procedure outlined above. The loading of the electrodes was 3.5 mg/cm². The cycling performance of these batteries are tested and shown in FIG. 7. Although the electrode loading of the silicon-carbon composites were also high at 3.5 mg/cm², cycling performance of the silicon-carbon material appear to be significantly decreased compared to the porous silicon material without carbon treatment.

Example 4

Figure 8:
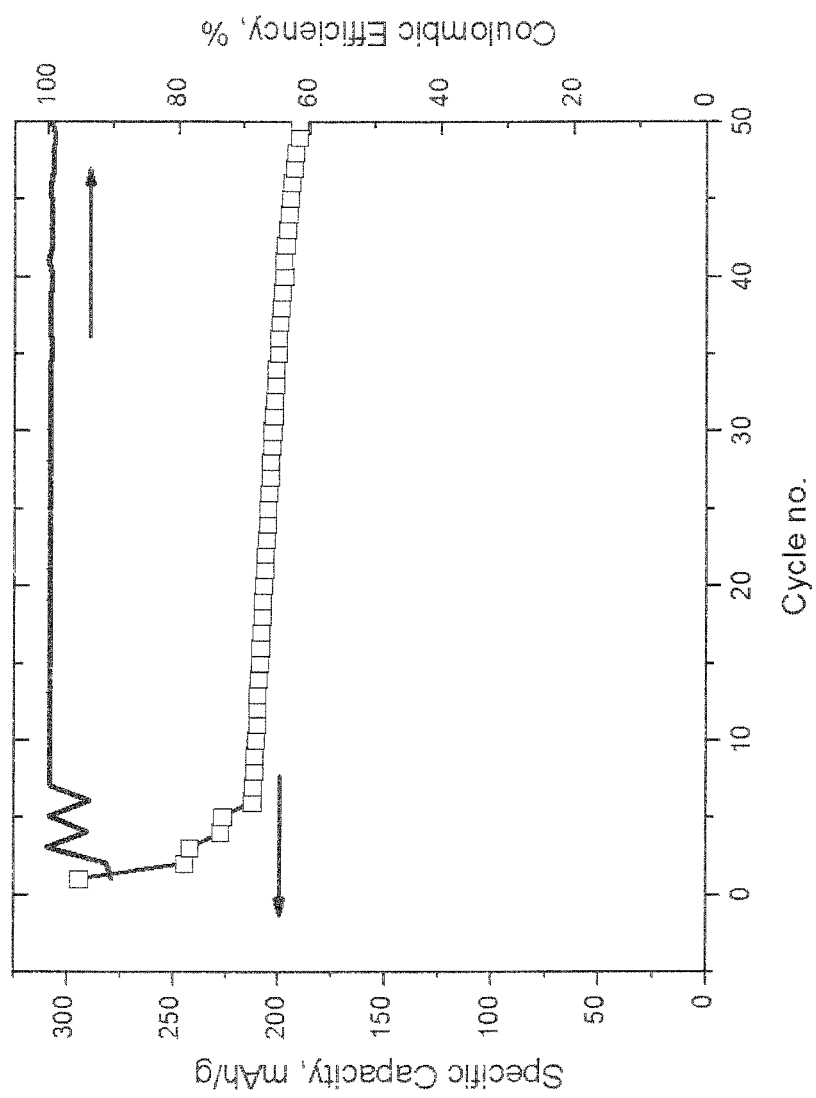
FIG. 8 shows specific capacity based on cathode active weight and Columbic efficiency versus cycle numbers of the batteries formed with porous silicon based material and HCMR™ cathode.

Cycling Performance of the Batteries Formed from the Porous Silicon Material with HCMR™ Cathode An anode formed from porous silicon material from example 1 was paired with HCMR™ cathode described above to form a battery, and the results demonstrate very promising performance. The anode was fanned with supplemental lithium in an amount to compensate for the IRCL of the negative electrode. The cycling performance of the battery was tested and is shown in FIG. 8. Specific capacity was evaluated based on the weight of the cathode active material. The battery was assembled and cycled as described above. The battery has a discharge specific capacity of at least 200 mAh/g at rate of C/3. About 90% of the capacity was retained above 175 mAh/g over 50 cycles. The coulombic efficiency is also plotted in FIG. 8 to graphically indicate the capacity was maintained out to 50 cycles.

Example 5

Formation of Porous Silicon Based Material Via Aluminium Reduction

The procedure outlined in. Example 1 was followed using aluminium instead of magnesium as the reducing agent. The procedure was followed by capturing the XRD patterns of heat treated (Al+SiO₂) sample and the sample obtained after the acid etching step. As shown in FIG. 9, after the heat treatment, silicon and aluminum oxide peaks were observed along with unreacted aluminum. The acidic etching step appeared to have removed the aluminum but at least some aluminum oxide still remained in the sample.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A porous silicon based material comprising particulate porous crystalline elemental silicon having an x-ray diffraction (XRD) spectra, using a Cu Kα a source, with a crystalline silicon peak at a value of 2θ of 28 to 30 degrees at least twice the peak intensity as a broad amorphous peak from 2θ of 15 to 25 degrees, and an average pore sizes in the range of 5 nm to 500 nm in diameter, wherein the porous silicon is substantially free of carbon embedded within the silicon structure, reducing metal and reducing metal oxides.

2. The material of claim 1 further comprising a carbon coating on the porous silicon.

3. The material of claim 1 wherein the porous silicon has a surface area from about 10 m²/g to about 200 m²/g.

4. The material of claim 1 having an average pore size from about 15 nm to about 200 nm.

5. The material of claim 1 having an x-ray diffraction (XRD) spectrum with a crystalline silicon peak at a value of 2θ of 28 to 30 degrees at least four times the greatest intensity from amorphous phase scattering from 2θ of 15 to 25 degrees.

6. The material of claim 1 having an x-ray diffraction spectrum with a broad monotonically decreasing amorphous scattering from 2θ of 10 to 25 degrees.

7. A lithium based battery electrode comprising a binder and the porous silicon based material of claim 1, wherein the electrode has a discharge specific capacity of at least 1800 mAh/g at the 7th cycle at rate of C/3 discharged from 1.5V to 0.005V against lithium.

8. The electrode of claim 7 wherein the electrode has an irreversible capacity loss from about 25% to about 15%.

9. The electrode of claim 7 wherein the electrode retains at least 80% of capacity up to 50 charge/discharge cycles.

10. The electrode of claim 7 wherein the binder comprises a polyimide binder.

11. The electrode of claim 7 wherein the electrode has a discharge specific capacity of at least 2000 mAh/g at the 7th cycle at rate of C/3 discharged from 1.5V to 0.005V against lithium.

12. The electrode of claim 7 wherein the electrode is contacting a current collector with a loading on one side of the current collector from about 1.4 mg/cm² to about 4 mg/cm².

13. A lithium ion battery comprising,
the electrode of claim 7;
a positive electrode comprising a lithium metal oxide approximately represented by the formula $Li_{1+b}Ni_\alpha M n_\beta Co_\gamma A_\delta O_{2-z}F_z$, where b ranges from about 0.01 to about 0.3, α ranges from about 0 to about 0.4, β range from about 0.2 to about 0.65, γ ranges from 0 to about 0.46, δ ranges from 0 to about 0.15 and z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V, Li or combinations thereof, and
a separator between the negative electrode and the positive electrode, wherein the positive electrode has a discharge specific capacity of at least 200 mAh/g at rate of C/3.

14. The battery of claim 13 wherein about 90% of the battery capacity was retained over 50 cycles relative to the 6th cycle at discharge rate of C/3.

15. The battery of claim 13 further comprising supplemental lithium.

16. A porous silicon based material comprising particulate porous crystalline elemental silicon having an average pore sizes in the range of 5 nm to 500 nm in diameter and a discharge specific capacity of at least 1800 mAh/g at the 7th cycle at rate of C/3discharged from 1.5V to 0.005V against lithium; wherein the porous silicon is substantially free of reducing metal and reducing metal oxides.

17. The porous silicon based material of claim 16 further comprising a carbon coating on the porous crystalline element silicon.

18. The porous silicon based material of claim 16 further comprising carbon nanofibers (CNF) blended with the porous crystalline elemental silicon.

* * * * *